United States Patent [19]

Noma et al.

[11] Patent Number: 5,029,429

[45] Date of Patent: Jul. 9, 1991

[54] SEALING DEVICE FOR FACSIMILE RECEIVING PAPER

[75] Inventors: Yasuo Noma, Osaka; Kiyotaka Ohnishi, Kyoto; Masaaki Matsushima; Kazuaki Nagase, both of Osaka, all of Japan

[73] Assignees: Iseto Shiko Co., Ltd., Kyoto, Japan; Yanmar Diesel Engine Co., Ltd., Osaka, Japan

[21] Appl. No.: 446,837

[22] Filed: Dec. 6, 1989

[30] Foreign Application Priority Data

Dec. 10, 1988 [JP] Japan ................................ 63-312544

[51] Int. Cl.⁵ ........................................... B65B 11/48
[52] U.S. Cl. ....................................... 53/120; 53/206
[58] Field of Search ................. 53/120, 117, 206, 460, 53/464, 389, 116

[56] References Cited

U.S. PATENT DOCUMENTS

| 3,336,726 | 8/1967 | Mayer et al. | 53/206 X |
| 4,179,111 | 12/1979 | Gunther, Jr. et al. | 53/460 X |
| 4,189,895 | 2/1980 | Volkert et al. | 53/206 X |
| 4,741,147 | 5/1988 | Noll | 53/206 X |
| 4,924,652 | 5/1990 | Krasuski et al. | 53/117 X |

*Primary Examiner*—James F. Coan
*Attorney, Agent, or Firm*—Armstrong, Nikaido, Marmelstein, Kubovcik & Murray

[57] ABSTRACT

A sealing device is provided for sealing facsimile receiving paper produced by a facsimile receiver device. The sealing device includes apparatus for taking in the facsimile receiving paper which is discharged from the facsimile receiving device, and a first folding arrangement for folding the paper in half. A second folding arrangement is provided for simultaneously folding the once-folded paper together with a sheet of envelope paper in a laminate arrangement. A sealing apparatus is provided to seal the envelope paper so as to enclose the facsimile receiving paper.

11 Claims, 24 Drawing Sheets

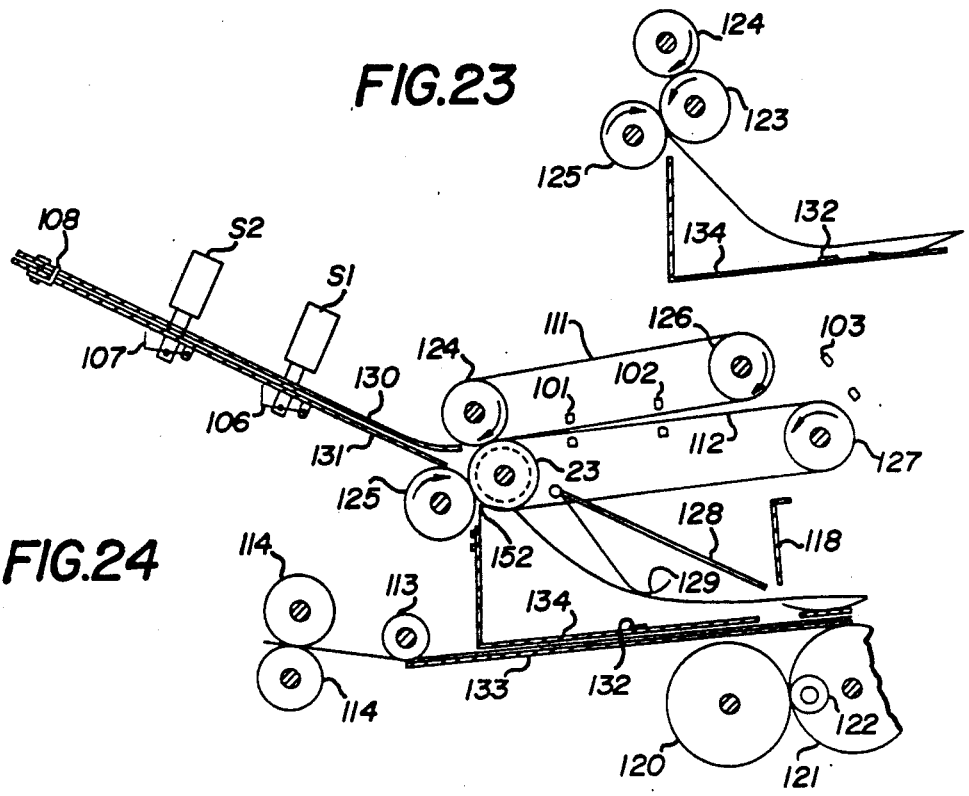
FIG.23
FIG.24
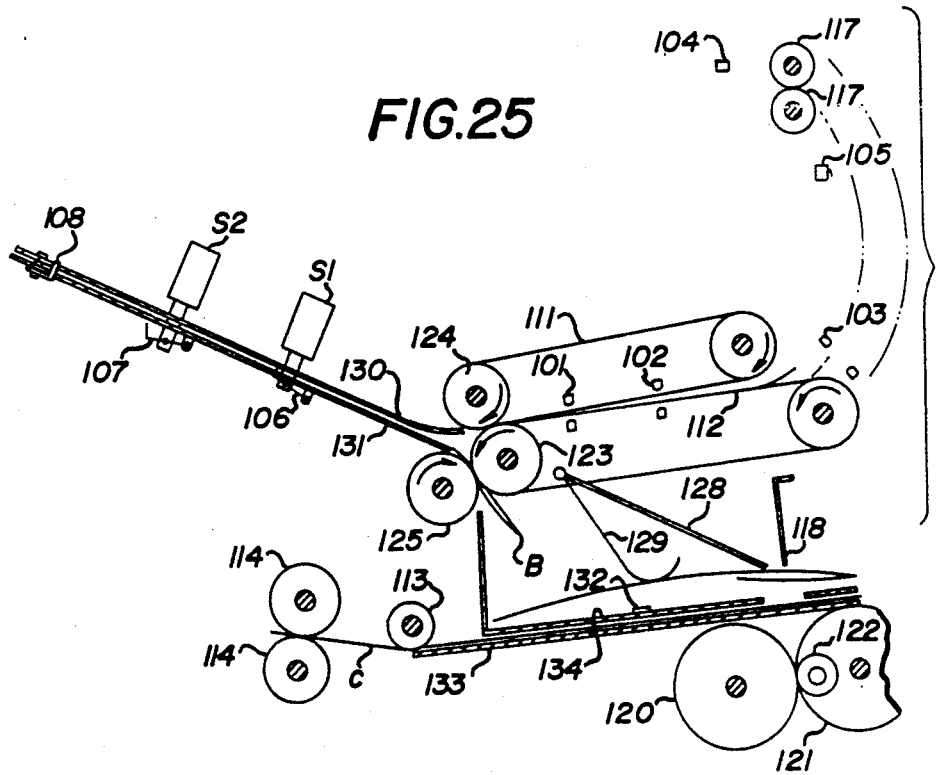
FIG.25

SEALING DEVICE FOR FACSIMILE RECEIVING PAPER

BACKGROUND OF THE INVENTION

This invention relates to a sealing device to secure confidentiality of facsimile receiving paper.

A device that seals receiving paper of documents sent by a facsimile apparatus to handle them as confidential documents has been widely known conventionally.

For example, in the Japanese Laid-open Patent No. 63-67072, a device which reads a discriminative pattern indicated on the leading part of receiving paper, switches transporting paths by distinguishing confidential documents from other documents and automatically receives in prepared envelopes is described.

On the other hand, in the Japanese Laid-open Patent No. 58-142664, a device which seals confidential documents by pasting them together in a stacked state so that the correspondence documents do not come out is disclosed.

In such conventional sealing devices, in a device which receives confidential documents in envelopes, a very complicated mechanism is required in order to automatically proceed the operation to open envelopes and insert receiving paper, and therefore, it is a disadvantage that such a device tends to cause troubles such as omission of inserting into envelopes. In addition, as receiving paper discharged from a receiver is inserted into an envelope in the size as it is, a very large envelope is required, and the device itself comes to be large in size as well.

On the other hand, in a device which pastes the discharged documents from a receiver together as they are, there is an inconvenience that the documents may be see-through from the back side, as thin paper is generally used for such receiving paper, and, in addition, it is a disadvantage of such device that the finished appearance is poor when receiving paper is pasted together in the discharged state. Therefore, in order to solve such inconveniences, it is very preferable to seal the receiving paper by overlaying and folding the facsimile receiving paper and envelope paper. In this case, in order to realize such procedure, a device that folds receiving paper and envelope paper, a device that cuts continuous envelope paper and a device that adheres the edges of the envelope paper by such a manner as compression bonding are required.

Moreover, in the aforementioned conventional sealing devices, although the purpose of all of them is the same as that of the invention in the point of preventing confidential documents from being read from outside, in these conventional devices, it has been a problem that the sealing devices have not been considered in connection with general facsimile receivers. In other words, in order to connect a general facsimile receiver to a sealing device, it is required that the receiving paper discharged from the receiver has to be securely sent into the sealing device side, but, conventionally, this point has not been sufficiently considered, and there has been such an inconvenience that the outlet of the receiver and the inlet of the sealing device tend to mutually dislocate while in use. It may also be considered to priorly manufacture a receiver and a sealing device in one unit, but it is a problem that no existing facsimile receivers can be used. Furthermore, in the aforementioned conventional sealing devices, even in the case that the length of receiving paper when received is different, they have been folded considering that the length of receiving paper is all the same conventionally. *However, when a short receiving paper is folded in the* same manner as a *long receiving paper, both sides of* folded receiving paper widely dislocate in the direction of the length, and they are transported in such state that the length of the folded upper side surface is shorter to be bias-folded paper. When the receiving paper succeedingly received is transported on the receiving paper in a bias-folded state, it may lead to an inconvenience that it sticks to the folded upper edge of the precedingly transported receiving paper and can not be securely stacked on the envelope paper.

Moreover, in the aforementioned conventional sealing devices, in the case that receiving paper longer than a specified length is sent from a sender's side, the receiving paper is so long that, even in the case of stopping the leading edge with a specified stopper, and folding, it can not be stacked with the envelope paper and the sealing comes to be impossible, which brings about another inconvenience.

It is hence a primary object of the invention to solve the disadvantages of conventional devices and to present an improved sealing device in which an inserting omission into an envelope and other errors do not occur, the entire structure is compact and the finishing of the sealed envelope has a superior appearance by folding the receiving paper together with the envelope to seal.

In addition, it is the other object of the invention to present an improved sealing device which can quickly seal the paper by simultaneously proceeding a series of steps such as folding the receiving paper in the case of folding it together with the envelope to seal, cutting, compression-bonding and adhering the edges.

Moreover, it is still other object of the invention to present an improved sealing device which, in the case of folding receiving paper exceeding a specified length, detects it and stops the steps of folding and sealing.

Hence, in order to solve the above objects, this invention comprises means for taking in receiving paper emitted from a facsimile receiver, first folding means for folding in double the taken-in receiving paper by the means, second folding means for folding the receiving paper and envelope paper simultaneously in such a state that the aforementioned folded receiving paper is stacked with the envelope paper, and means for sealing the receiving paper by adhering the edges of the envelope paper.

Other objects, compositions and operational effects of the invention will be better understood from the following detailed description of the invention.

BRIEF DESCRIPTION OF THE DRAWINGS

FIG. 23 is a partial side view showing near the roller exit of receiving paper folding guide.

FIGS. 24 to 26 are partial side views showing the operation of the embodiment in FIG. 20.

DESCRIPTION OF THE PREFERRED EMBODIMENTS

Figure 2:
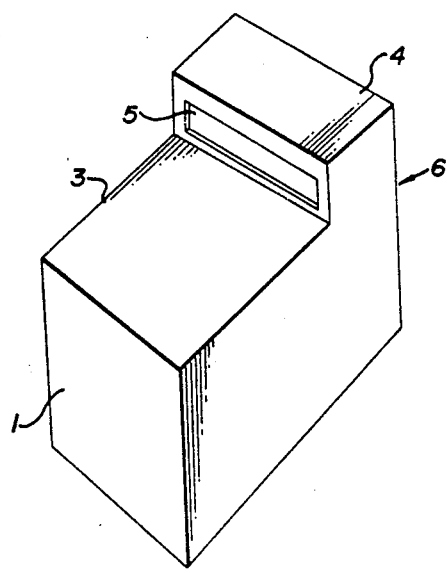
FIG. 2 is a perspective view showing the appearance of the invention.

FIG. 2 shows the appearance of a sealing device 1 of the embodiment, wherein a box 6 formed in a box shape is raised in a part at one end of the upper surface, the upper surface other than the raised part 4 is a shelf part 3 on which a facsimile receiver 2 is mounted, and facing to the shelf part 3, on the side surface of the raised part 4, an inlet 5 for receiving paper is opened.

Figure 1:
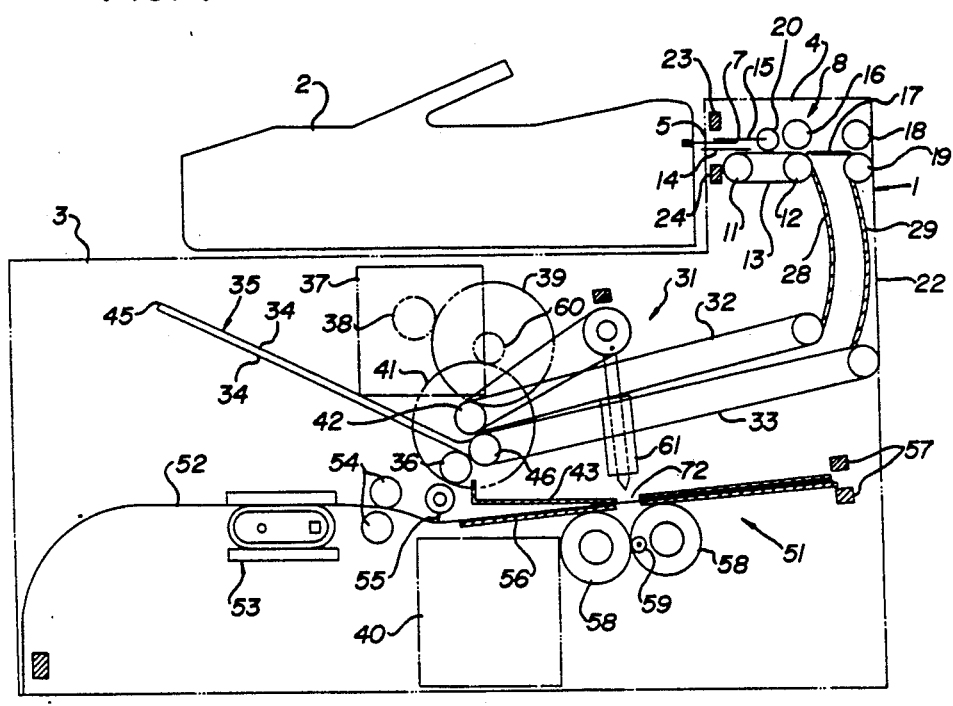
FIG. 1 is a drawing showing an overall composition of a sealing device of the invention.
Figure 5:
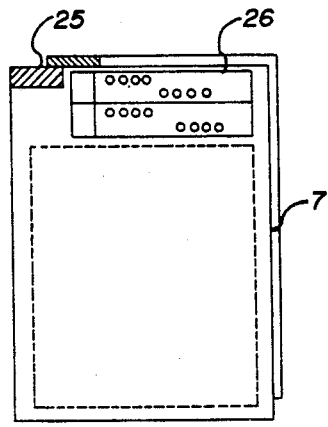
FIG. 5 is a front view of receiving paper.
Figure 3:
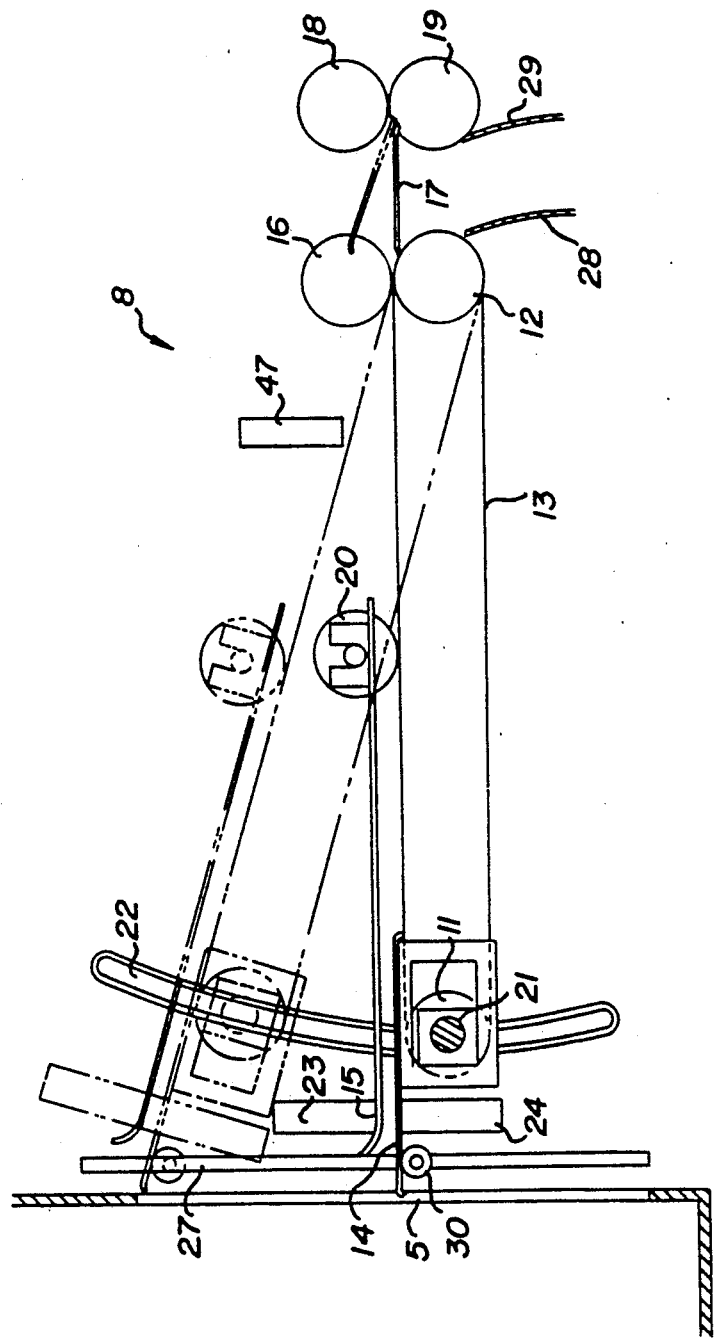
FIG. 3 is a side view of a feed-out mechanism of a facsimile receiver of the invention.
Figure 4:
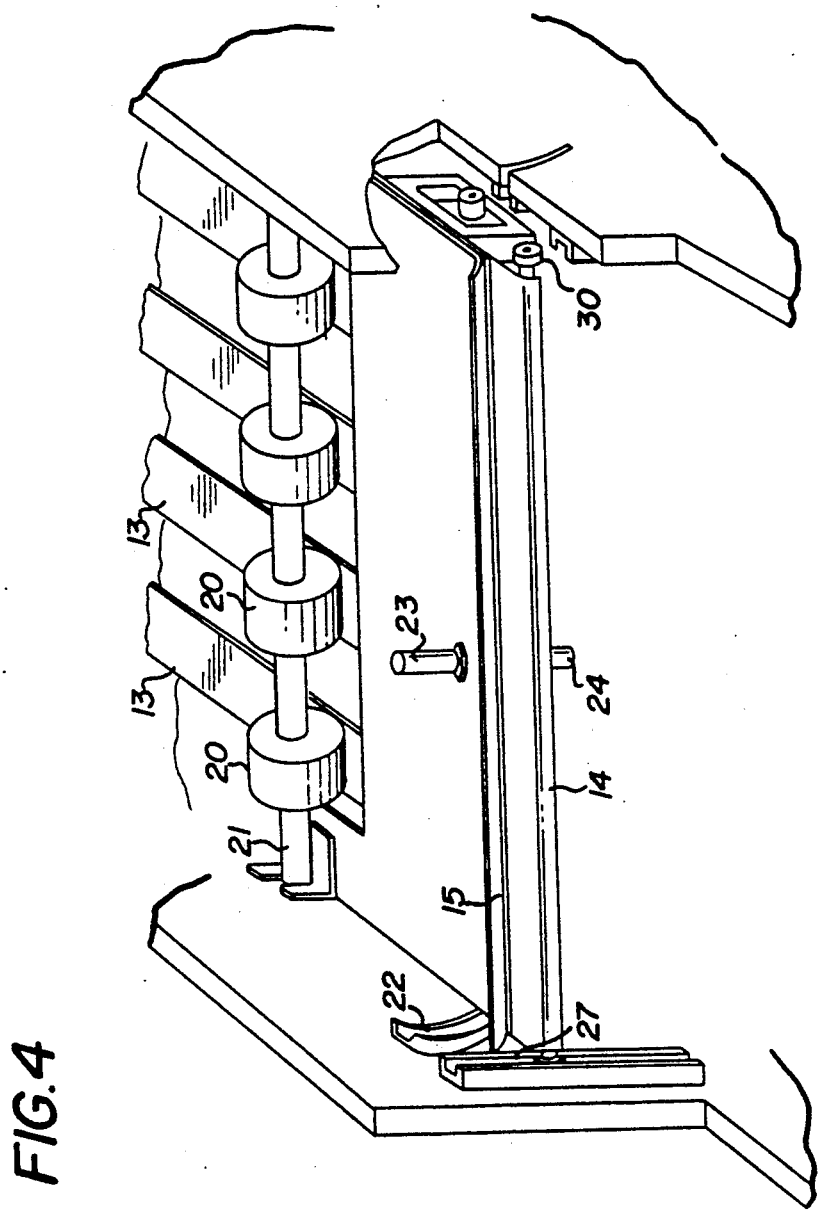
FIG. 4 is a perspective view of the feed-out mechanism in FIG. 3.

FIG. 1 shows the structure in the box 6, wherein a feed-out mechanism 8 to feed out receiving paper 7 discharged from the receiver 2 backward is employed inside the inlet 5 in the raised part 4. As shown in FIGS. 3 and 4, the feed-out mechanism 8 comprises a feed-out belt 13 wound between pairs, for example four pairs of belt rollers 11 and 12, a lower take-in guide plate 14 constructed extending to the inlet 5 side from the upper end of the inlet 5 of the feed-out belt 13, an upper take-in guide plate 15 positioned in a spacing to the upper side of the guide plate 14, a guide roller 16 placed on the backward roller 12 winding the belt 13, a switching gate 17 positioned backward of the guide roller 16 and switching the feed-out directions according to confidential documents and general documents, a pair of upper and lower feed-out rollers 18 and 19 feeding out only general documents and so on. Above the middle part of the feed-out belt 13, a presser roller 20 which pinches the receiving paper 7 between the belt 13 and the roller 20 is employed. The belt roller 11 on the side of the inlet 5 is supported to a shaft 21, and both sides of the shaft 21 are inserted into a fixing guide 22 curved in the upper and lower directions, so that the belt roller 11 can roll upward and downward along the fixing guide 22 with the fulcrum at the center of the backward roller 12. The shaft 21 can be fixed at a desired position by such means as screws. Together with the upward and downward rolling of the roller 11 and the belt 13, the lower guide plate 14, the upper guide plate 15 and the presser roller 20 also roll upward and downward Above the edge of the upper guide plate 15 on the side of the inlet 5, a discriminative sensor 23 is placed which discriminates whether the received document 7 is a confidential document or a general document. The discrimination of documents is performed, as shown in FIG. 5, by reading a discriminative pattern 25 recorded priorly at a corner of the leading part of the receiving paper 7 by the sensor 23 to distinguish whether it is a confidential document or a general document. For example, when the discriminative pattern 25 is recorded, it is a confidential document, and when it is not recorded, it is a general document. On the other hand, on the opposite side of the discriminative sensor 23, below the lower guide plate 14, a document take-in sensor 24 which detects whether the received document 7 is entering through the inlet 5 or not is placed. On the leading part of the receiving paper 7 in the feed-out direction, a destination recorded column 26 to record the name of the receiver is employed. The numeral 27 in FIG. 3 is a grooved vertical guide positioned on the both sides of the lower guide plate 14, and as both ends of a sliding bar 30 fixed on the lower end surface of the lower guide plate 14 on the side of the inlet 5 are inserted therein, when the end part of the belt 13 is rolled upward and downward as mentioned before, this sliding bar 30 moves linearly upward and downward so that the positioning of the end part of the lower guide plate 14 and the inlet 5 in the feeding direction is always kept specifically.

In the aforementioned structure, as shown in FIG. 1, the receiving paper 7 discharged from the facsimile receiver 2 enters into the inlet 5 and is fed out on the feed-out belt 13 passing between the upper and lower guide plates 14 and 15. When the receiving paper 7 comes approximately to the middle of the feed-out belt 13, the leading part of the receiving paper 7 is put between the presser roller 20 and the feed-out belt 13, then, fed out by the feed-out belt 13 and put between the backward guide roller 16 and the belt roller 12 to be fed out forward In the case that the document distinguished by the discriminative sensor 23 is a general document, the switching gate 17 is in a horizontal state, and therefore, the receiving paper 7 passes on this gate 17 and is put between the backward send-out rollers 18 and 19 for general documents to be discharged sideward. On the other hand, in the case the document recorded on the receiving paper 7 is a confidential document, as the end part on the side of the belt 13 of the switching gate 17 rolls upward, the receiving paper 7 is fed out downward from the point that it comes out of the feed-out belt 13. Therein, as such receiving paper 7, generally a rolled type is widely used, and as the leading end of the receiving paper 7 discharged from the receiver 2 tends to bend downward, it is fed out smoothly downward. In the lower part between the backward roller 12 which winds the feed-out belt 13 and the guide roller which emits general documents, a pair of right and left transporting guides 28 and 29 which guide the receiving paper 7 downward are constructed, and the paper is fed out downward passing between the guides 28 and 29. These guides 28 and 29 are also curved to meet the bending of the receiving paper 7 so that it is more smoothly fed out downward. Then, the receiving paper 7 fed out downward in this manner is fed out to the side of a transporting and folding mechanism 31 constructed in the lower end side of the transporting guides 28 and 29.

The transporting and folding mechanism 31 comprises, as shown in FIG. 1, a pair of upper and lower transporting belts 32 and 33 positioned slantwise downward from the exit end of the guide plates 28 and 29 and composing the transporting path of the invention, a folding guide 35 composed of a pair of upper and lower plates 34 and 34 positioned slantwide upward from the back end of the transporting belts 32 and 33, and folding guide rollers 36, 42 and 46 positioned close to the exit end of the lower transporting belt 33. In the upper part of the back end of the upper transporting belt 33, the first driving motor 37 is positioned, and the rolling power is transmitted from a pinion 38 employed in the driving shaft of the driving motor 37 through an intermediate gear 39, an intermediate pinion 60 and a driven gear 41 to the backward roller 42 of the upper transporting belt 32. The upper transporting belt 32 is placed in such a manner that the edge on the side of the guide plates 28 and 29 is relatively higher than the lower transporting belt 33 to have a spacing to the lower transporting belt 33 at its entrance side thereby, and the receiving paper 7 fed out between the two belts 32 and 33 is drawn in the state of being pinched by folding guide rollers 42, 46 which are the second transporting means as the leading end of the paper comes near the exit side of the belts 32 and 33. It is because the drawing force causes an unnecessary load to the receiver 2, if the receiving paper 7 discharged from the receiver 2 is drawn by these transporting belts 32, 33 in a state of being uncut by the receiver 2. Under the lower transporting belt 33, a receiver tray 43 bent in L shape is employed.

Figure 6:
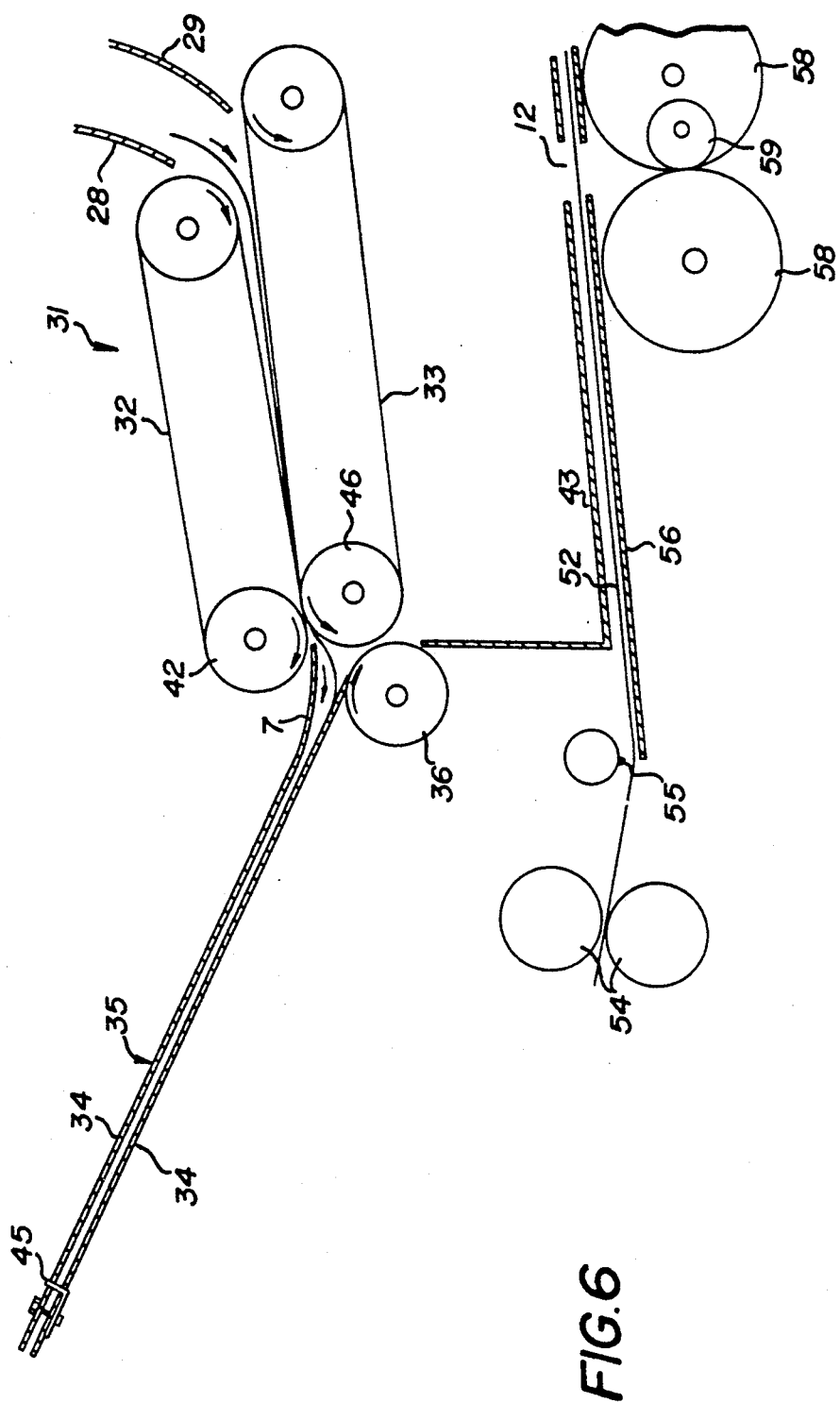
FIGS. 6 to 10 are side views showing the operation of take-in and folding mechanisms of receiving paper.

Sequentially, the operation of the transporting and folding mechanism 31 is described herein below, referring to FIG. 6.

Figure 7:
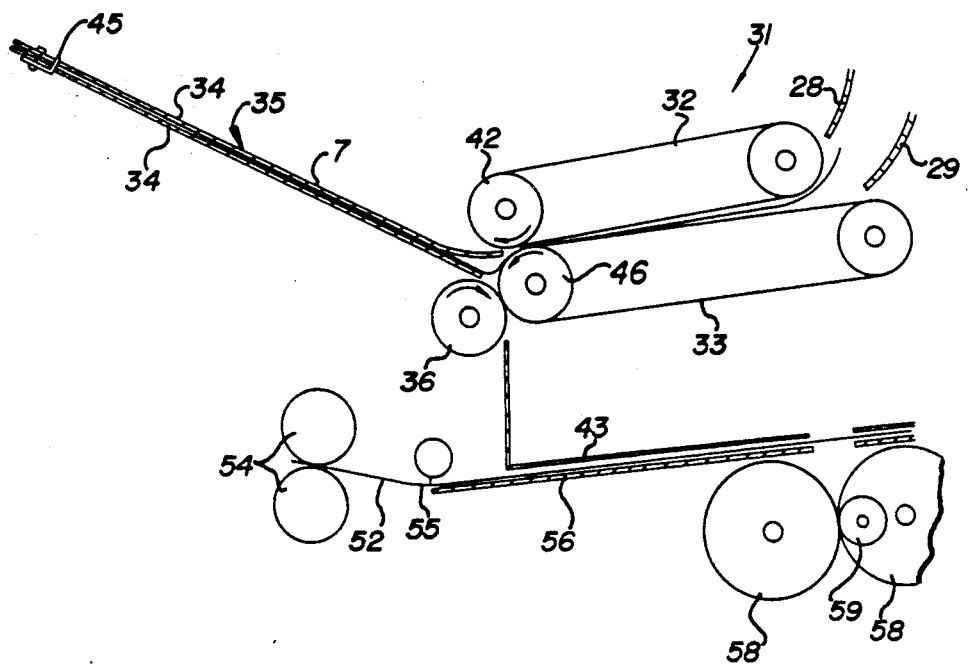
Figure 8:
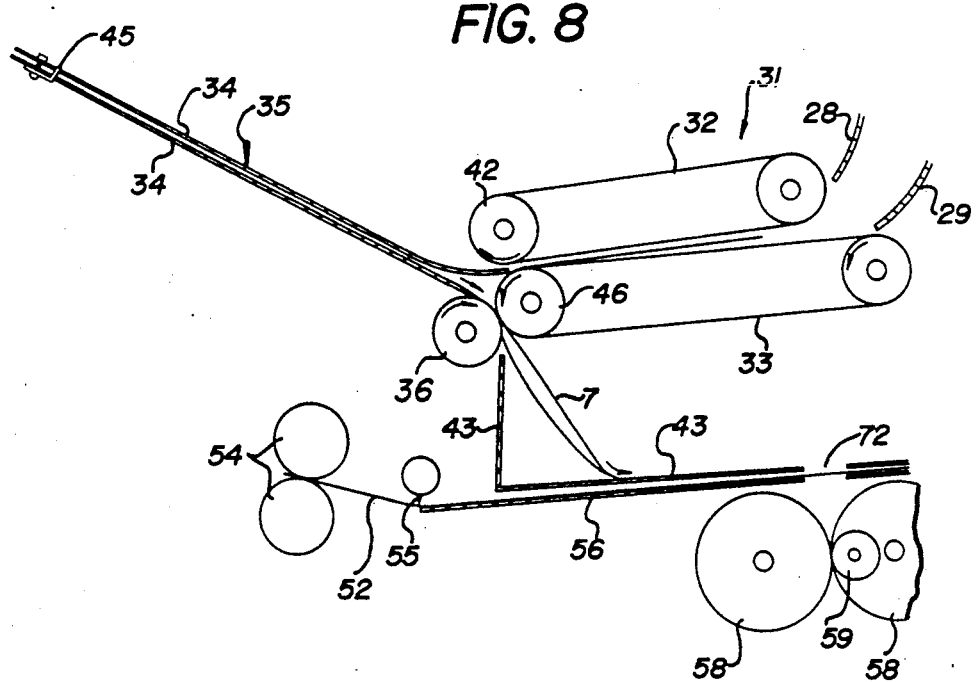
Figure 9:
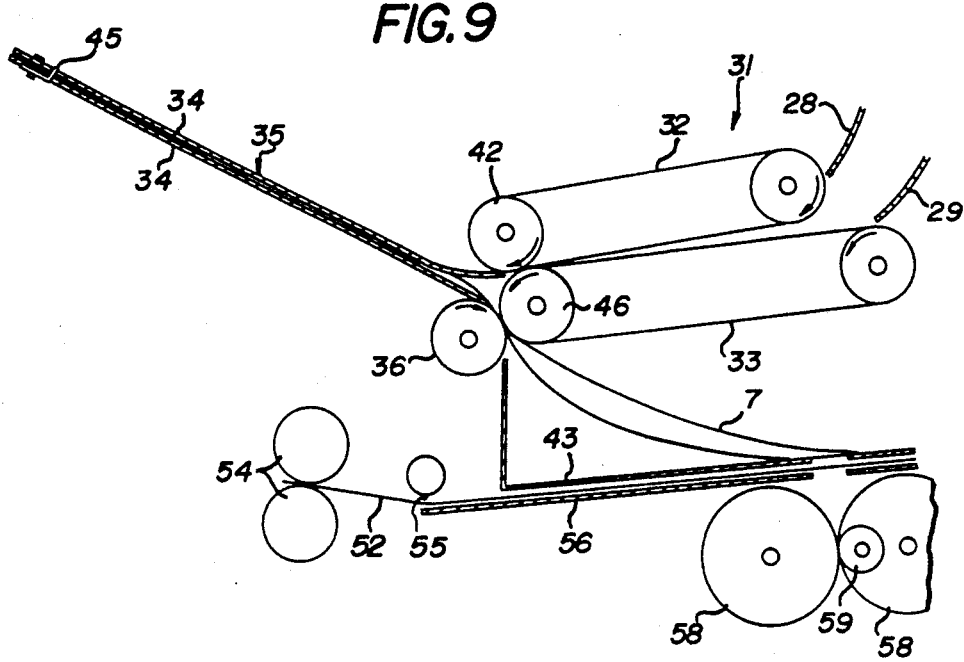
Figure 10:
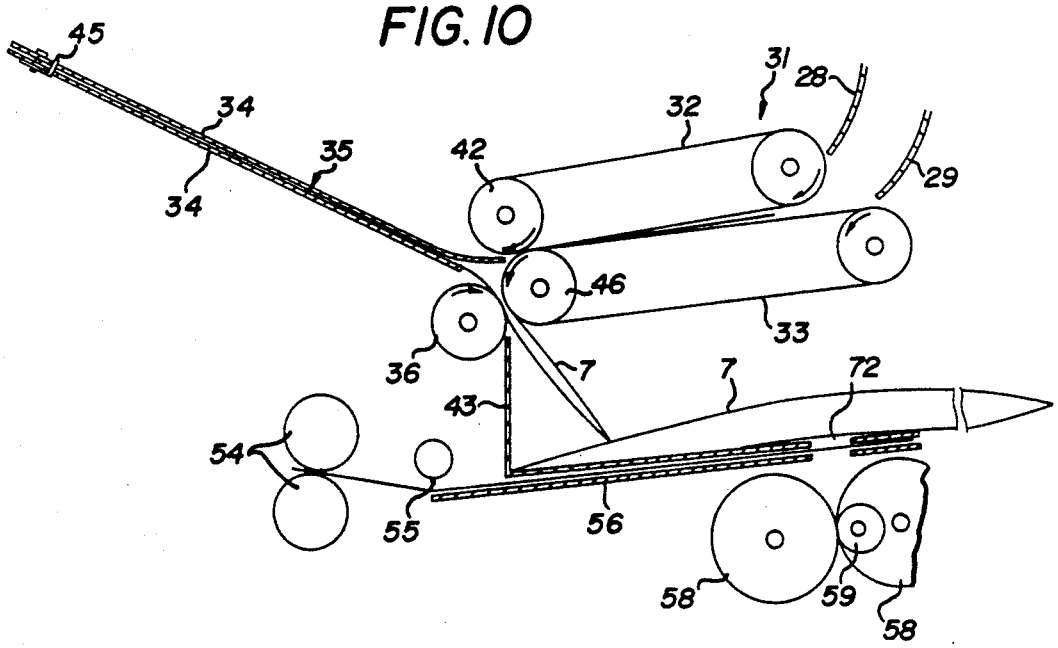

First, the receiving paper 7 fed out downward by the guide plates 28 and 29 enters between the upper and lower transporting belts 32 and 33. Then, as the leading edge of the receiving paper 7 comes near to the exit end between the two belts 32 and 33, it is pinched and drawn by folding guide rollers 42, 46, and fed out, as shown in FIG. 6, into a slit between the plates 34 and 34 of the folding guide 35. On the leading end of the folding guide 35, a stopper 45 is mounted, and when the leading edge of the receiving paper 7 contacts the stopper 45, as shown in FIG. 7, a slack is caused in the receiving paper 7 protruding downward at the entrance end of the folding guide 35 by the send-out of the folding guide rollers 42, 46. As the slacking is created along the direction of the curving tendency of the receiving paper 7 as previously mentioned, it is a smooth action. As the paper is fed out further by the folding guide rollers 42, 46, the leading part folded in the slacking part is put between the folding guide roller 36 and folding guide roller 46 at the exit end side of the lower transporting belt 33 and fed out downward, that is, onto the receiver tray 43 by these folding guide rollers 36, 46 (FIGS. 8 and 9). Therein the receiving paper 7 is plaited in such a state that the recorded surface of the document is on the lower side. Thus, plural sheets of the receiving paper 7 cut by the receiver 2 are stacked on the receiver tray 43 (FIG. 10). The transporting and folding work of such receiving paper 7 is terminated when the document take-in sensor 24 (FIGS. 1 and 3) detects the termination of reception. The detection of the termination of reception by the document take-in sensor 24 is performed by measuring the time from the moment that the final receiving paper 7 fed out from the receiver 2 passes the document take-in sensor 24 and confirming that no succeeding receiving paper 7 is coming in after a specified time. In other words, as shown in FIG. 3, in the feed-out mechanism 8, a paper length sensor 47 is employed in front of the backward guide roller 16 of the feed-out belt 13. When the position of the leading edge of the receiving paper 7 is detected by this paper length sensor 47, the document take-in sensor 24 determines the presence or absence of paper, and in the case that the paper is not present already then, the length of the paper is shorter than the specified length. In this case, since the action by the drawing and folding mechanism 31 is impossible, the discriminative gate 17 is bent downward to discharge the paper as general documents.

Succeedingly, the receiving paper 7 stacked thus on the receiver tray 43 is sealed by the plaiting and sealing mechanism 51. The mechanism is described in detail below.

Figure 11:
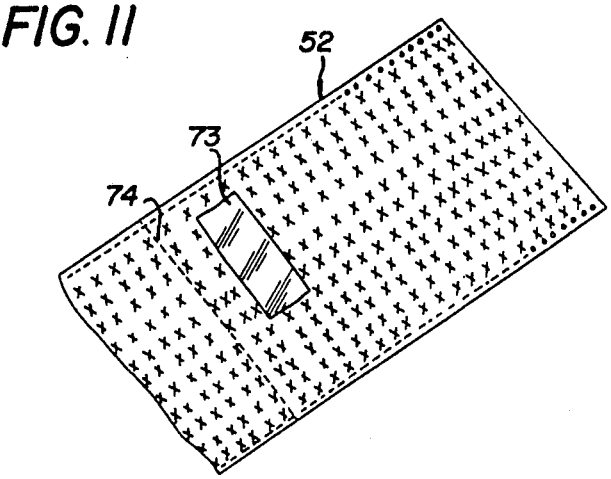
FIG. 11 is a perspective view of envelope paper.
Figure 12:
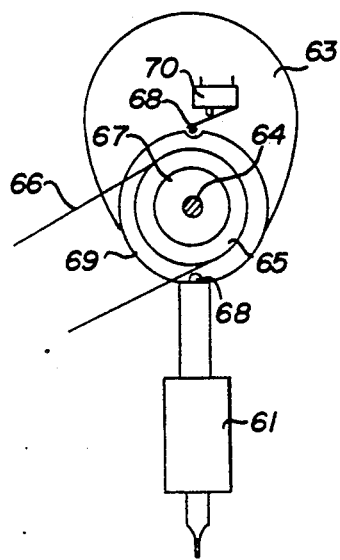
FIG. 12 is a side view of the cam part for driving a plaiting blade.
Figure 13:
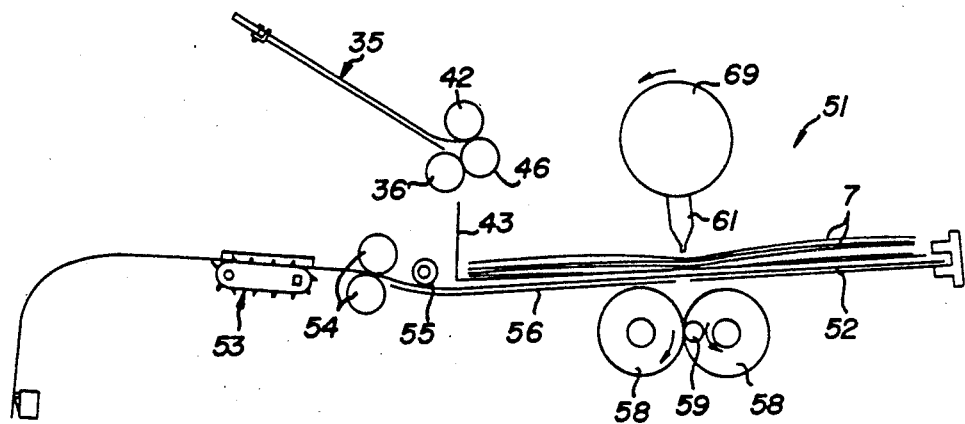
FIGS. 13 to 15 are side views showing the operation of a plaiting and sealing mechanism.
Figure 16:
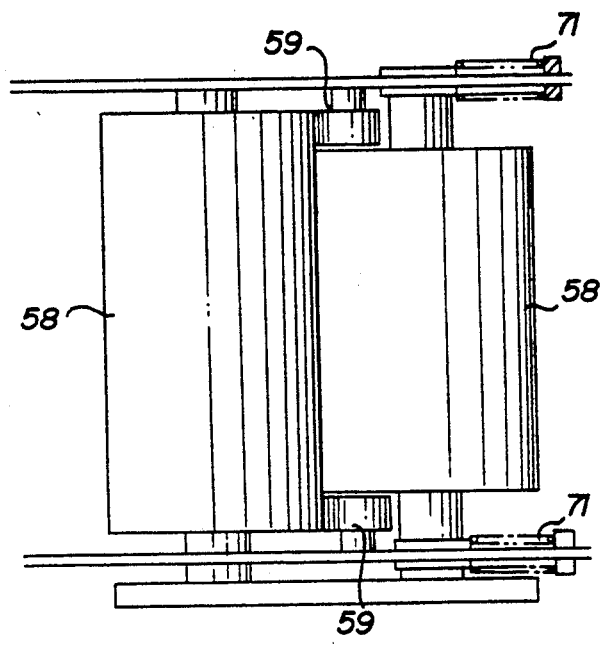
FIG. 16 is a plan view of the compression roller part.

As shown in FIG. 11, a continuous form with a number of holes in the both deckle edges is used as envelope paper 52 to enclose and seal the receiving paper 7, and the envelope paper 52 is fed out to the side of the receiver tray 43 from beneath the folding guide 35 by a known tractor feeder 53 (FIGS. 1 and 13) driven by the driving motor 40. As shown in FIG. 13, in the front part of the tractor feeder 53, a pair of upper and lower feed-out guide rollers 54 and 54 are employed to pinch the envelope paper 52 and in the front part of the feed-out guide rollers 54 and 54, a cutting buster knife 55 is positioned to cut the envelope paper. The envelope paper 52 fed out by the guide roller 54 passes beneath the buster knife 55 and fed out forward passing between a guide plate 56 positioned below the receiver tray 43 and the receiver tray 43. In the front part of the guide plate 56, an envelope paper waiting sensor 57 is employed, and when the sensor 57 senses that the leading end of the envelope paper 52 is fed out to this point, the feeding of the envelope paper 52 is stopped. The envelope paper 52 waits as it is thus fed out. Centered below the buster knife 55 and the envelope paper waiting sensor 57, edge compression bond rollers 58 and 58 are placed under the guide plate 56, and, as shown in FIG. 16, on both sides of one compression bond roller 58, a deckle edge compression bond roller 59 is employed. Here, the term deckle edge refers to the sizing margins 221 at both ends of the line when the envelope paper is folded (see FIG. 11). These compression bond rollers 58 and 59, guide roller 54 (FIG. 13) and tractor feeder 53 are, as shown in FIG. 1, driven by the second motor 40 employed on their side. Moreover, corresponding to the compression bond rollers 58 and 59, over the receiver tray 43, a plaiting blade 61 is placed in the downward direction. As shown in FIG. 12, over the plaiting blade 61, a cam 63 which moves the plaiting blade 61 upward and downward is supported by a shaft. Between a belt pulley 65 attached to the shaft 64 of the cam 63 and the roller 42 on the exit end side of the upper drawing belt 32 on the side of the drawing and folding mechanism 31, a driving belt 66 is wound. In other words, while the cam shaft 64 is rotated by the first motor 37 through the belt 66, between the cam shaft 64 and the cam 63, a one-way clutch 67 is employed which transmits the power in one direction, and therefore, when the motor 37 rotates clockwise, the rolling force is not transmitted to the cam 63 side, but when the motor 37 rotates counterclockwise, the cam 63 rotates in that direction. On the cam shaft 64, a slit plate 69 formed with a groove 68 on two points of the outer circumference is attached. The slit 69 is also conducted through the aforementioned one-way clutch 67, and when the connecting part of a limit switch 70 falls into one of the grooves 68 and 68, the limit switch 70 is actuated to stop the counterclockwise operation on the motor 37 side. In other words, in this embodiment, since the grooves 68 and 68 are formed with a spacing of 180 deg. on the circumference of the slit plate 69, every time the slit plate 69, or the cam 63 rolls halfway round, the counterclockwise movement of the motor 37 stops.

Figure 14:
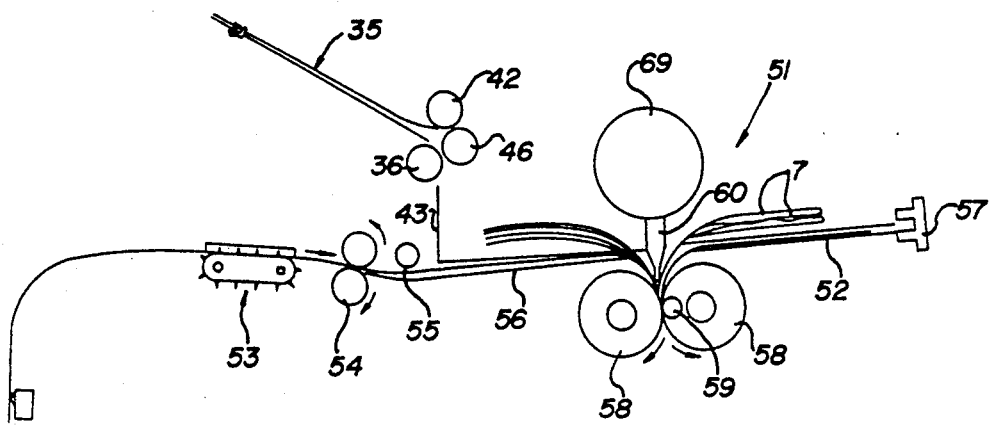
Figure 15:
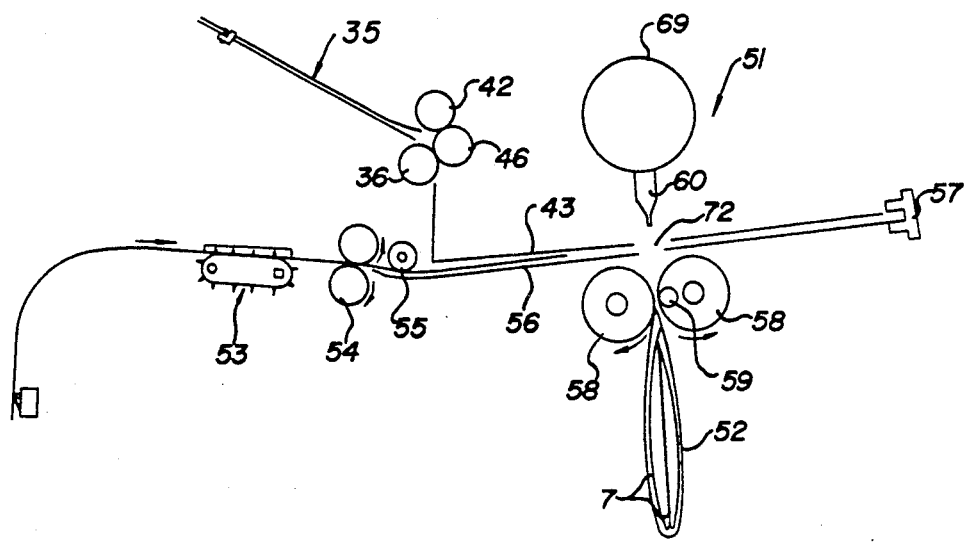
Figure 17:
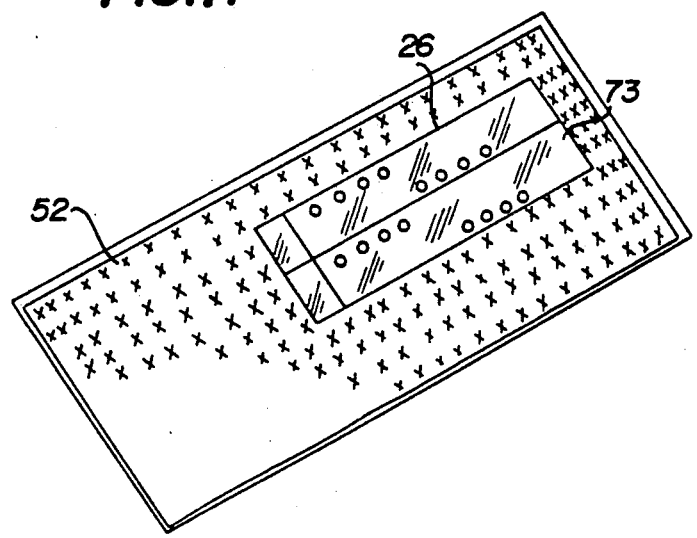
FIG. 17 is a perspective view of an envelope sealed with receiving paper.

Succeedingly the operation of the folding and sealing mechanism 51 is described. As priorly mentioned, when the termination of the discharge of received documents is detected by the document take-in sensor 24, as shown in FIG. 13, the first motor 37 stops the clockwise driving in such a state that the final receiving paper 7 is stacked on the receiver tray 43. Then, by driving the motor 37 counterclockwise from this state, the cam 63 rotates by the action of the one-way clutch 67. Thus, the plaiting blade 61 is lowered, and the receiving paper 7 and the envelope paper 52 are pushed out downward as they are doubled through a spacing 72 formed in the receiver tray 43 and the guide plate 56. In this step, the envelope 52 is slacked under the buster knife 55. As shown in FIG. 14, before the leading end of the folded part of the envelope paper 52 is put between the compression bond rollers 58 and 59, the motor 60 is driven, and the compression bond rollers 58 and 59 and the envelope paper feed-out roller 54 rotate. Since the peripheral speed of the compression bond rollers 58 and 59 is higher than that of the envelope paper feed-out roller 54, a tension is created in this part, and as a perforated line 74 is priorly formed in the envelope paper 52 as in FIG. 11, it is easily cut by the buster knife 55 by this tension. On the envelope paper 52, a pressure sensitive adhesive is priorly applied on the sizing margins 221 at the leading edge and the both deckle edges, and by the pressure of these compression bond rollers 58 and 59, the envelope is discharged downward as in FIG. 15 with the three edges adhered and the receiving paper 7 enclosed and sealed inside. As shown in FIG. 16, one of the pair rollers 58 and 58 which compression-bond the leading end of the backward part of the envelope paper 52 in the feeding direction is pressed in the other by a spring 71 and, when the number of the received documents 7 is large, retreats to meet it. As shown in FIGS. 11 and 17, a transparent window 73 is formed in a part of the envelope paper 52, and therefore, the record printed on the destination column 26 of the firstly discharged receiving paper 7 can be read through this transparent window 73. By thus plaiting, the receiving paper 7 is folded quadruple. However, the number of plaits differs depending on the length of the received document 7, and in some cases, it is folded triple.

Figure 18:
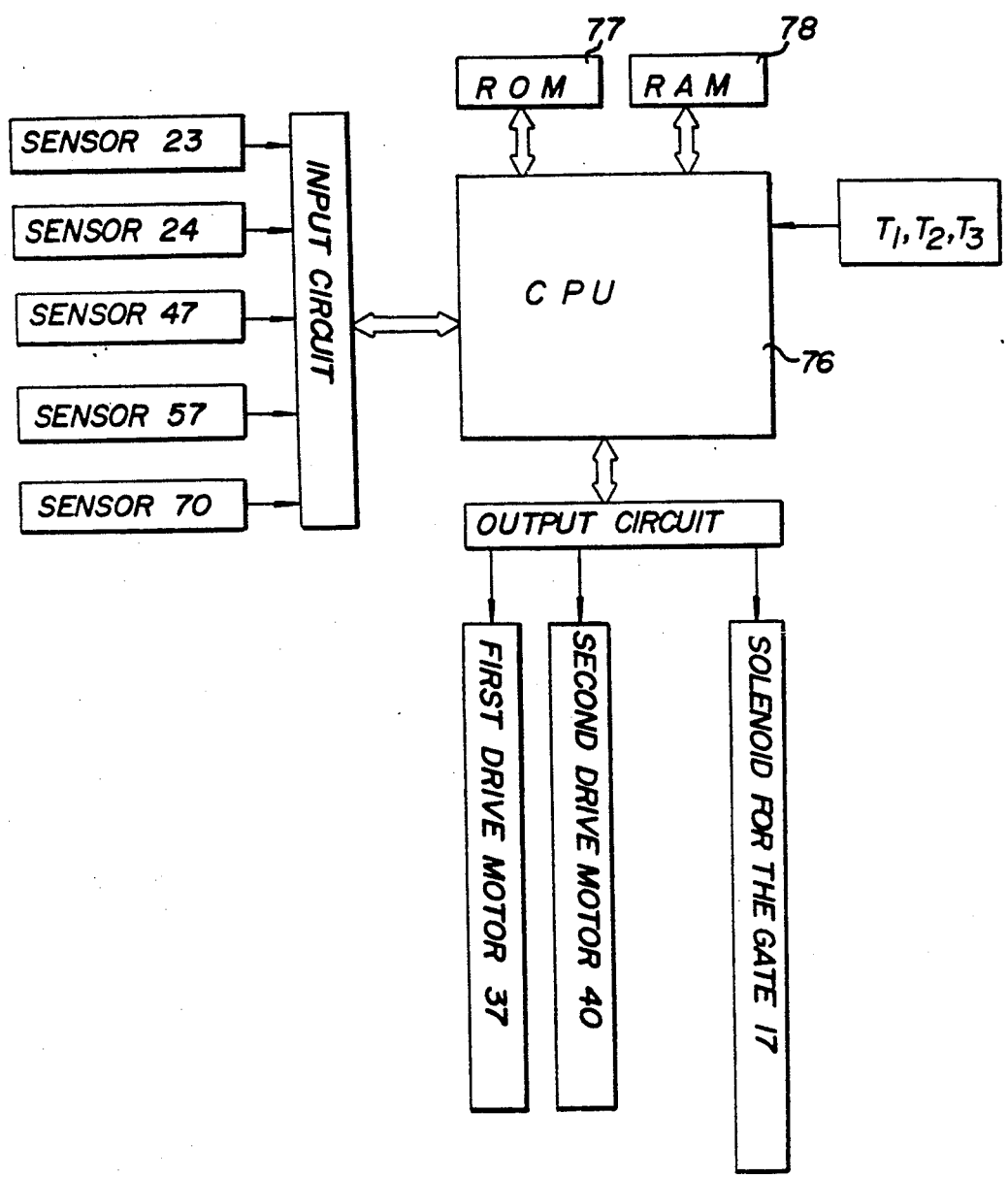
FIG. 18 is a block diagram of a control device for controlling each mechanical part.

FIG. 18 shows a control device to control the sealing device. In the figure, numeral 76 is a CPU (central processing unit) which performs various calculations and control, numeral 77 is a ROM (read only memory) which stores the program of the run procedure of the CPU 76, and numeral 78 shows a RAM (random access memory) which memorizes various data. In the CPU 76, a detected signal from the sensors 23, 24, 47, 57 and 70 shown in the figure is input through the input circuit. The control signal of the CPU 76 is output to a solenoid to open the driving motors 37 and 40, tractor feeding 53 and the switching gate 17 through the output circuit. The CPU 76 has three timers T1, T2 and T3.

Figure 19:
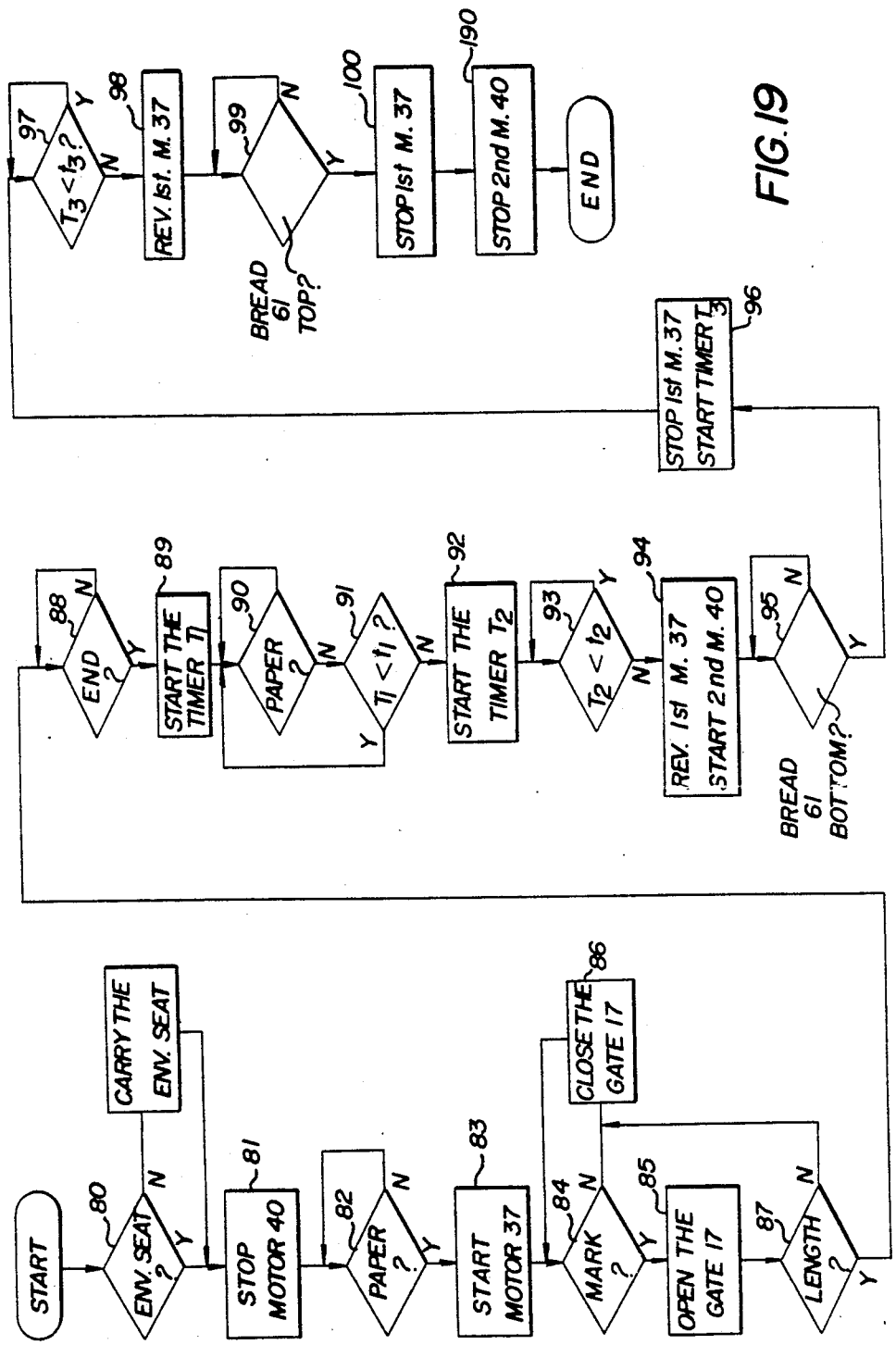
FIG. 19 is a flowchart of FIG. 18.

FIG. 19 shows a flowchart showing the control flow by the control device. In the figure, steps 84, 85 and 86 show the flow to determine whether it is a confidental document or not. Step 87 is a process to determine whether the length of paper is sufficient or not and to discharge paper of insufficient length (such paper that does not meet the length of the folding guide 34). Steps 89, 90 and 91 are processes to determine whether the sending of one document is finished or not, and when the time T1 between the termination of the take-in of paper and the take-in of the succeeding paper comes to be equal to the specified time t1, it means that the sending of one document is finished. In other words, by considering that the interval between documents is longer than the time interval of one continuous document and thereby, setting the time t1 at a longer time (approximately 13 seconds in general) than the interval of one continuous document, the termination of one document is determined. This method of judgment of end of one document may be replaced by the reception end signal from the facsimile apparatus. Furthermore, in steps 92 and 93, a waiting time t2 is employed to obtain the timing for sealing. Steps 94 and onward are the flow to actually perform sealing and cutting of the envelope paper. In these steps, as the timer T3 is employed to stop the blade 61 at the bottom dead position for a specified time t3 by a known art, it is not described in detail.

Meanwhile, this sealing device 1 performs sort operation, in which a set of receiving papers 7 discharged from the facsimile receiver 2 of which start and end of a series of documents are judged is put into an envelope paper, so that plural documents addressed to different destinations are individually sealed for every addressee.

Thus, as the receiving paper is folded and sealed with the envelope paper in such a manner, and more particularly the sealing means is placed between the pair of rollers, being close to the compression bonding means presenting a compression bonding force capable of compression-bonding the both ends of the envelope paper in double folding direction and both sides of one of the pair of rollers, and both edges of the double folding portion of the envelope paper are sealed by the compression bonding rollers for compression-bonding to said one of the rollers, unlike a conventional manner of inserting into a ready-made envelope, errors such as an omission of inserting into an envelope or unappropriate insertion never occur. Moreover, as the paper is not inserted in an envelope or pasted in the size as it is, the size of the device comes to be smaller, and the finishing is very beautiful. Furthermore, since the receiving paper is not pasted as it is, such inconvenience that the description of the document can be read from the back side does not occur.

In addition, in the transportation of the receiving paper, since the receiving paper is transported in a slippable state in the step before it is cut off the receiver, no unnecessary load is loaded on the receiving paper, and a trouble of the receiver is not caused. Moreover, when the discharged document reaches the transporting path, as it is transported to the second transporting means by this transporting path, by matching the length from the receiver to the transporting path to the maximum length of the paper, even in the case of a smaller document than that, it can be transported to the sealing mechanism as far as it is not extraordinary small. Furthermore, by curving the transporting path, the entire device can be manufactured in a compact size, and as it is curved to the same direction as the curved direction of the receiving paper by the roll, it serves to transport the receiving paper more smoothly.

Figure 20:
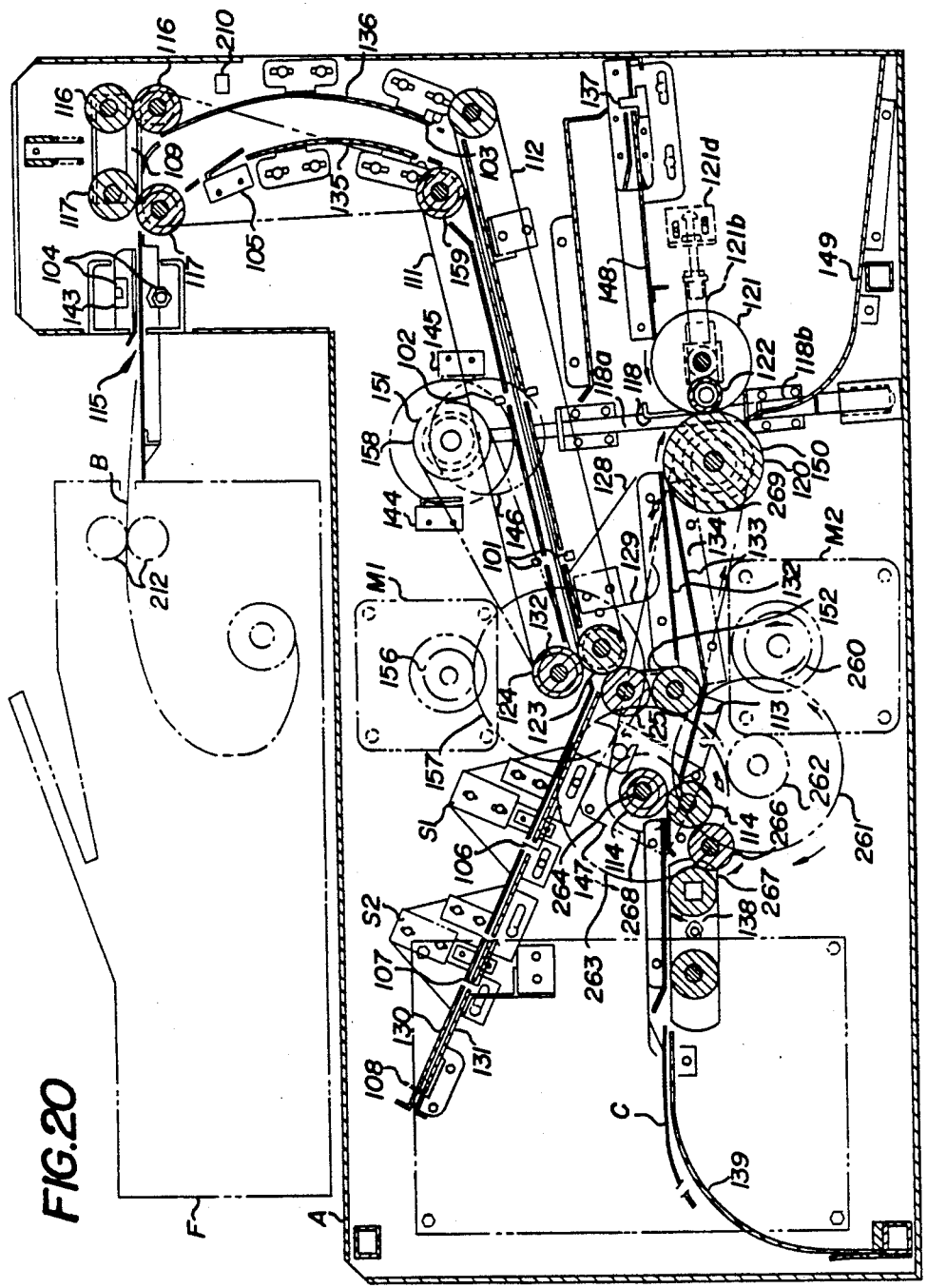
FIG. 20 is a side sectional view showing the other embodiment of the invention.

FIG. 20 is a side sectional view where a facsimile receiver F is placed on the shelf part AS of the upper surface of the box (excluding the raised part At) of a sealing device A for facsimile receiving paper. The facsimile receiver F is a common type, and the receiving paper received by the facsimile receiver F is inserted through the receiving paper inlet 115 opened on the side surface of the raised part At. In the case of a document required to be sealed, a form of a sending document is differently determined, and in a specified place of the first sheet of the sending document, a discriminative pattern X indicating that it is a confidential document required to be sealed is printed as shown in FIG. 21.

The discriminative pattern X is detected by a discriminative sensor, that is a reflector type optical sensor 143 placed just behind the receiving paper inlet 115, and in the case of a confidential document required to be sealed, a switching gate 109 positioned between two pairs of upper and lower guide rollers 117, 117, 116 and 116 shown in FIG. 20 is switched to draw the receiving paper B into the sealing device.

Figure 21:
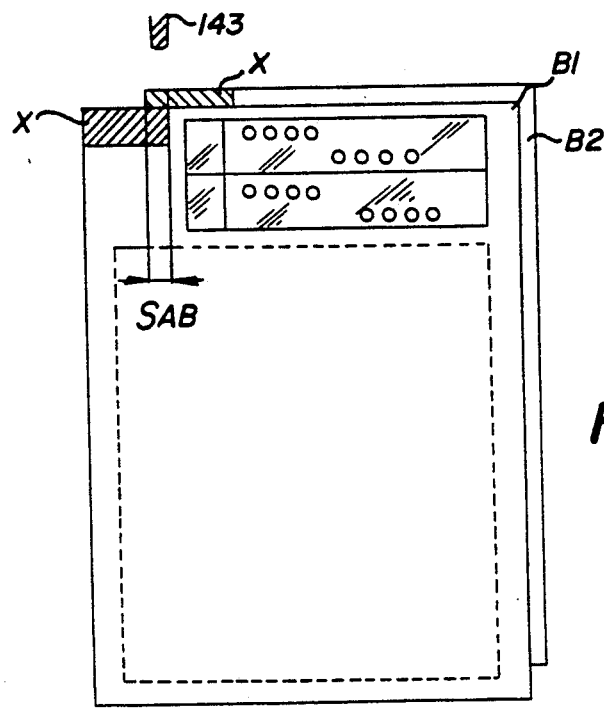
FIG. 21 is a front view showing an example of confidential documents.

Meanwhile, the relation between the discriminative pattern X of confidential documents shown in FIG. 21 and the discriminative sensor 143 is described. For example, in the case of transmitting documents of A4 [210 mm (8½ in.)×297 mm (12 in.)] and B4 [257 mm (10 in.)×364 mm (14½ in.)] size in the Japanese Industrial Standard (JIS P 0138), or similarly in the case of A5 [148 mm (6 in.)×210 mm (8½ in.)] and B5 [182 mm (7½ in.)×257 mm (10 in.)] size, the size of the discriminative pattern X is set widthwise so that the sealing device A can guarantee the detection of the discriminative pattern X by the discriminative sensor 143, even if the document is sent adjusted on the right or left edge, or at the center. For example, in the embodiment in FIG. 21, the upper receiving document B1 of B4 size is received being adjusted on the left edge, while the lower receiving document B2 of A4 size is received being adjusted on the right edge with respect to the receiving paper B1, and a discriminative pattern X is printed on the receiving paper B1 and B2 on the left shoulder. In this state, the size of the discriminative pattern X of the receiving paper B1 and B2 widthwise is set so that the overlaying area SAB where they overlay upward and downward as shown in the figure. By mounting a sensor which securely detects the discriminative pattern X on the discriminative sensor 143 to face the overlaying area SAB, even if the document is sent adjusted on the right or left edge, or at the center, no more than two discriminative sensors 143 are required.

The receiving paper B of which path was changed in the sealing device by the switching gate 109 explained in FIG. 20 lowers between fixing guide plates 135 and 136 and is transported into a curved transportation path between an upper transporting belt 111 and a lower transporting belt 112.

In the case that the receiving paper B is of a roll type remaining a tendency to bend its leading edge downward, it is smoothly transported downward along the curved transportation path, and an inconvenience such as paper jam near the switching gate 109 never occurs.

An excess length sensor 105 is employed in a part of the fixing guide plate 135, and a pair of mutually facing receiving paper input sensors, that is, transmission type optical sensors 104 are employed near the receiving paper entrance 115 across the receiving paper path.

Near the lower end of the fixing guide plates 135 and 136, a recording paper length sensor, that is, a transmission type optical sensor 103 is placed, and above and below the upper transporting belt 111 and the lower transporting belt 112, recording paper length sensors, that is, transmission type optical sensors 102 and 103 are employed.

Figure 22:
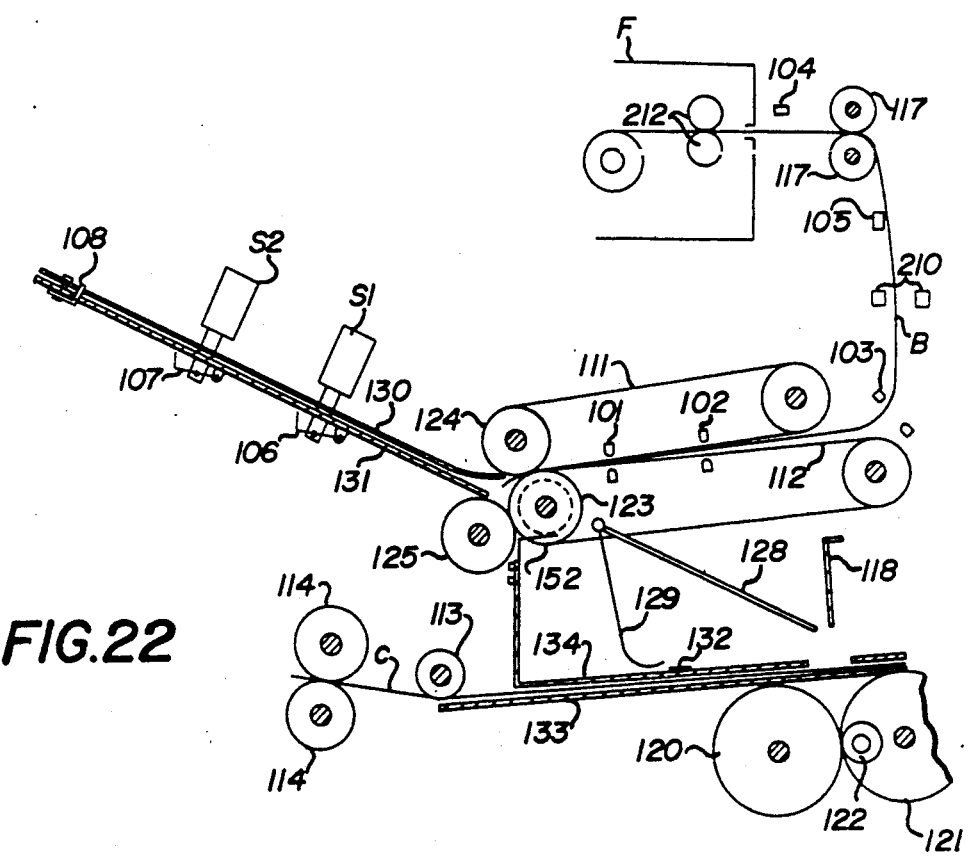
FIG. 22 is a partial sectional view of the embodiment in FIG. 20.

The receiving paper, that is, the recording paper B is transported, as shown in FIG. 22, in a stacked state on the lower transporting belt 112, and the upper transporting belt 111 is composed to gradually approach the lower transporting belt 112.

Then, in a folding guide roller 124 which drives the lower end of the upper transporting belt 111 and a folding guide roller 123 which drives the lower end of the lower transporting belt 112, both rollers are constructed to contact each other to pinch the recording paper B.

A folding roller 125 is placed to contact the folding guide roller 123 below it.

In addition, upper and lower stopper guide plates 130 and 131 are placed parallel so that the leading end of the recording paper B fed out being pinched by the folding guide rollers 123 and 124 can invade.

Then, between the upper and lower stopper guide plates 130 and 131 placed parallel, protruding middle length stoppers 106 and 107 and a maximum paper length stopper 108 are constructed.

Although the maximum paper length stopper 108 is constantly fixed at the protruding side, the middle length stoppers 106 and 107 are supported to be retractable by solenoids S1 and S2.

While the leading edge of the recording paper B is pushed out by the folding guide rollers 123 and 124 to invade between the stopper guide plates 130 and 131, when the leading edge touches the stopper, further invasion is obstructed, the middle part of the recording paper B starts flexing at the point that it comes out of the folding guide rollers 123 and 124, the flexing part is put between the folding guide rollers 123 and 125, and the recording paper B is supplied onto the recording paper tray 134 in a doubled state.

The first folding part of the invention comprises the guide rollers 123, 124, folding roller 125, stopper guide plates 130 and 131, and stopper 106, 107 or 108.

In order to stack the folded recording paper B sufficiently on the recording paper tray 134, recording paper pressers 129 and 128 vertically hanging from above and a slip stopper 132 adhered on the upper surface of the recording paper tray 134 are employed.

The envelope paper C is supplied from outside the sealing device A along an envelope paper guide plate 139, and by a tractor feeder 138, a specified length of paper is accurately fed in such a state that transportation pins are inserted through the forced feeding holes in the deckle edges of the envelope paper C.

The envelope paper C coming out of the tractor feeder 138 passes through an envelope paper feed-in roller 114 having an electromagnetic brake 147 (FIG. 20), then, from an envelope paper guide plate 133 to pass above sealing folding rollers 120 and 121 and a deckle edge compression-bonding roller 122 (closely contacting the both surfaces of the roller 121 in the direction of the shaft and pressure-contacting the roller 120 to roll) and reaches an envelope paper guide plate 148 with an envelope paper waiting sensor 137 mounted on it.

When a series of folding process of the receiving papers detected by the discriminative sensor 143 (FIG. 20) finishes, a plaiting blade 118 is pressed downward, and the stacked envelope paper C and the recording paper B are folded between sealing folding rollers 120 and 121. Therein, the roller 121 moves forward and backward in the expanding direction of a pressure spring 121b (FIG. 20) according to the thickness of the envelope paper C and the recording paper B in the stacked direction. The pressure spring 121b is held between a roller shaft 121c and a fixing part 121d of the sealing device A.

The second folding part of the invention comprises the aforementioned plaiting blade 118 and sealing folding rollers 120 and 121.

Figure 33:
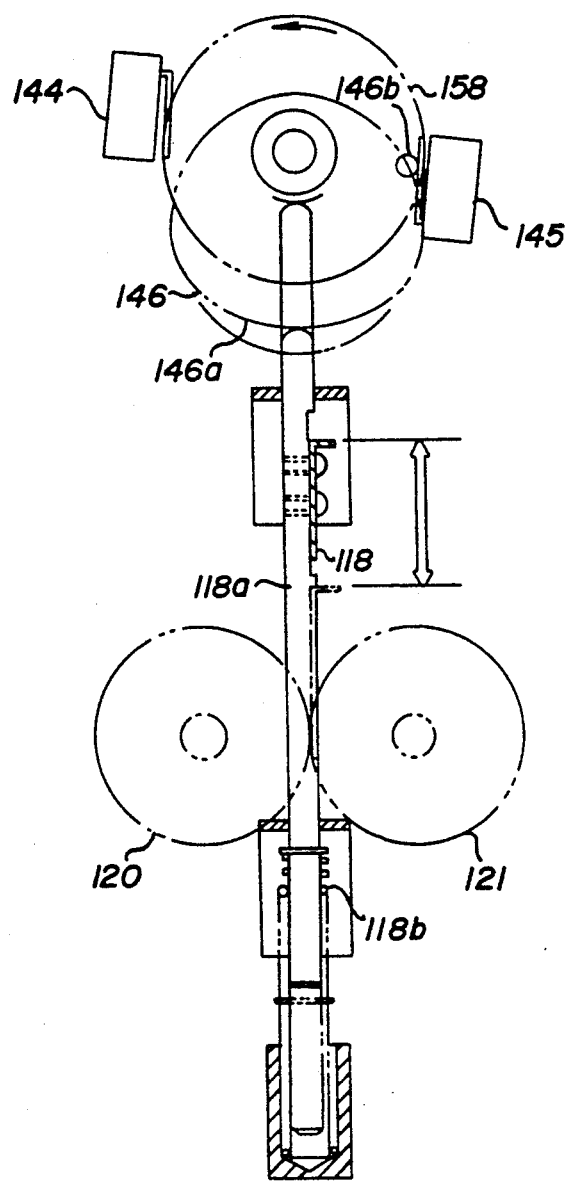
FIG. 33 is a side sectional view showing the driving part of an eccentric cam shaft.
Figure 34:
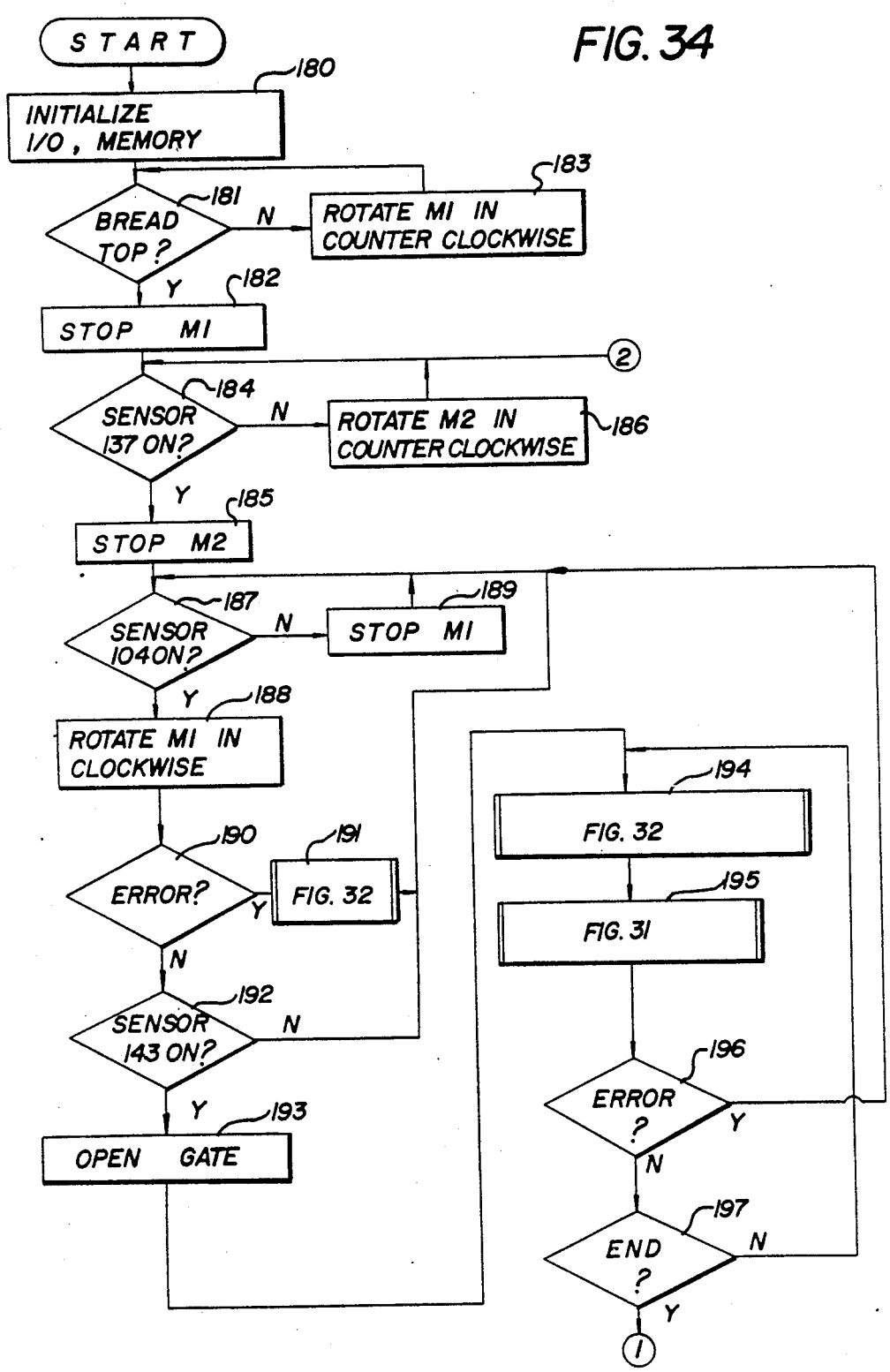
FIG. 34 is a flowchart including the input control routine of receiving paper exceeding a specified length and folding position control routine in FIG. 31 and FIG. 32.
Figure 35:
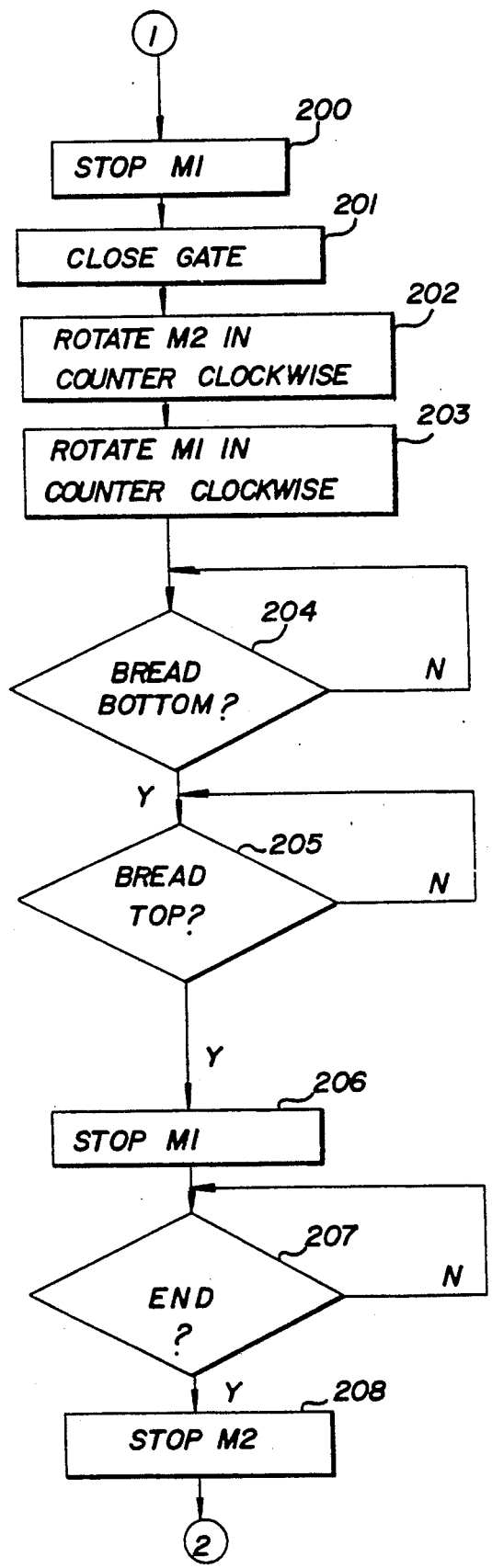
FIG. 35 is a flowchart showing the succession to step 1 in FIG. 34.

As shown in FIG. 33, the plaiting blade 118 is moved upward and downward by an eccentric cam ring 146, and the upper and lower dead points of the plaiting blade 118 are detected by plaiting blade position sensors 144 and 145 fixed along the outer circumference of the eccentric cam shaft 158 rolling united to the eccentric cam ring 146, respectively.

The envelope paper C and the recording paper B folded by the plaiting blade 118 and sealed by the sealing folding rollers 120 and 121 drop along a discharge guide plate 149.

Returning to FIG. 20, the first driving motor M1 drives folding guide rollers 123 and 124 and a folding roller 125 as well as the eccentric cam ring 146 of the plaiting blade 118 moving upward and downward.

The rolling direction of the folding guide rollers 123 and 124 and that of the eccentric cam ring 146 are set reversely, and as a one-way clutch 151 is employed in the driving part of the eccentric cam ring 146, the eccentric cam ring 146 is constructed not to roll while the recording paper B is transported by the folding guide rollers 123 and 124. Reversely, when the eccentric cam ring 146 rolls, although the folding guide rollers 123 and 124 keep rolling, it causes no effect as the recording paper B is not pinched.

The second driving motor M2 rotates clockwise and counterclockwise to drive the envelope paper feed-in roller 114 and the tractor feeder 138, and it is constructed to drive the sealing folding rollers 120 and 121 as well by a counterclockwise rotation. A one-way clutch 150 is employed in the driving part of the sealing folding roller 120 so that the sealing folding rollers 120 and 121 do not roll while the envelope feed-in roller 114 and the tractor feeder 138 are driven.

When the sealing folding rollers 120 and 121 and the deckle edge compression-bonding roller 122 roll and pull the envelope paper C in order to simultaneously fold and seal the stacked envelope C and the recording paper B, as the envelope paper feed-in roller 114 is inactivated by the electromagnetic brake device 147, and thereby the envelope paper is quickly pulled from the slacked state, the envelope paper C is cut with an impact at the perforated line positioned exactly under a buster knife 113 which is placed between the envelope paper feed-in rollers 114 and 114 and the sealing folding rollers 120 and 121 to cut in the perforated line downward.

In FIG. 22, the composition and the operation of excess length sensor 105 is described.

The excess length sensor 105 is placed between a pair of guide rollers 117 and 117 and the folding guide rollers 123 and 124, and its transporting speed is faster than the feed-out speed of recording paper from the facsimile device F (FIG. 20).

Therefore, in the case that the recording paper B has such excess length that the leading end of the paper is pinched by the folding guide rollers 123 and 124, it is pulled between the facsimile device F and the folding rollers 123 and 124 and is put into such situation that the recording paper B passes the excess length sensor 105.

Figure 32:
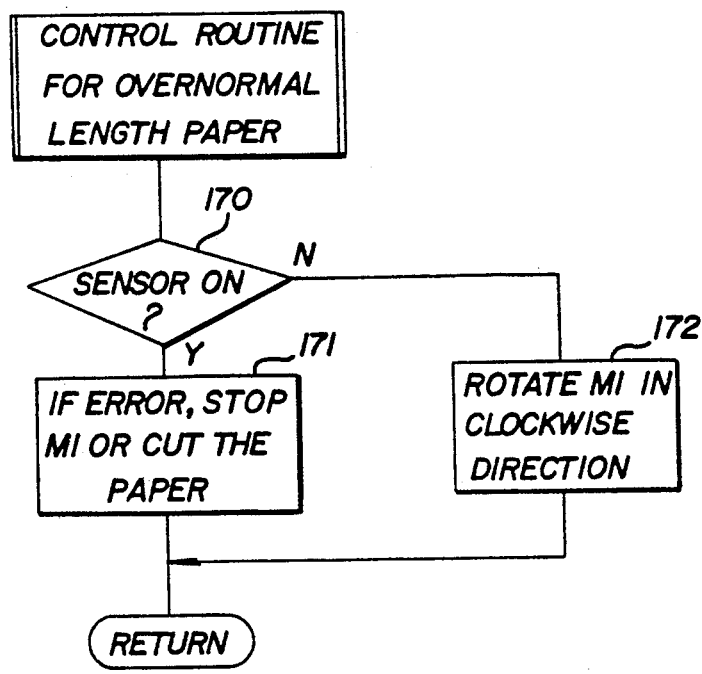
FIG. 32 is a flowchart showing the control by an overlength sensor.

Thus, when the excess length sensor 105 turns on, as shown in FIG. 32, the control flowchart is activated.

In other words, in step 170, when the excess length sensor 105 turns on, it proceeds the error processing.

For the error processing, it is preferable to perform the following step 1 or 2.

1. When the excess length sensor 105 detects (turns on) that the length of the recording paper B exceeds a specified length, the first driving motor M1 is temporarily stopped, and then, if the excess length sensor 105 turns off again, the first motor M1 is rotated to feed in the recording paper B.

By such a continuous ON-OFF control, the recording paper B can be supplied into the sealing device A without creating an excessive tension caused by the difference in peripheral speed between the folding guide rollers 123 and 124, and a recording paper feed-out roller 212 in the facsimile device F, but as the recording paper B with an excess length is stacked in the sealing device A in such a state that it can not be sealed, in the subsequent main routine, the sealing operation is not performed by an occurrence of error.

2. When the excess length sensor 5 is turned on, by activating a cutter 210 in FIG. 22, the recording paper B being supplied is cut into a length that is possible to be processed for folding and sealing.

Thus, the sealing device A can continuously take in the recording paper B after that, and the folding and sealing actions after the error processing need not be prohibited, thereby enabling a continuous automatic receiving.

Referring to FIGS. 23 to 26, the folding of middle length paper is described.

Figure 31:
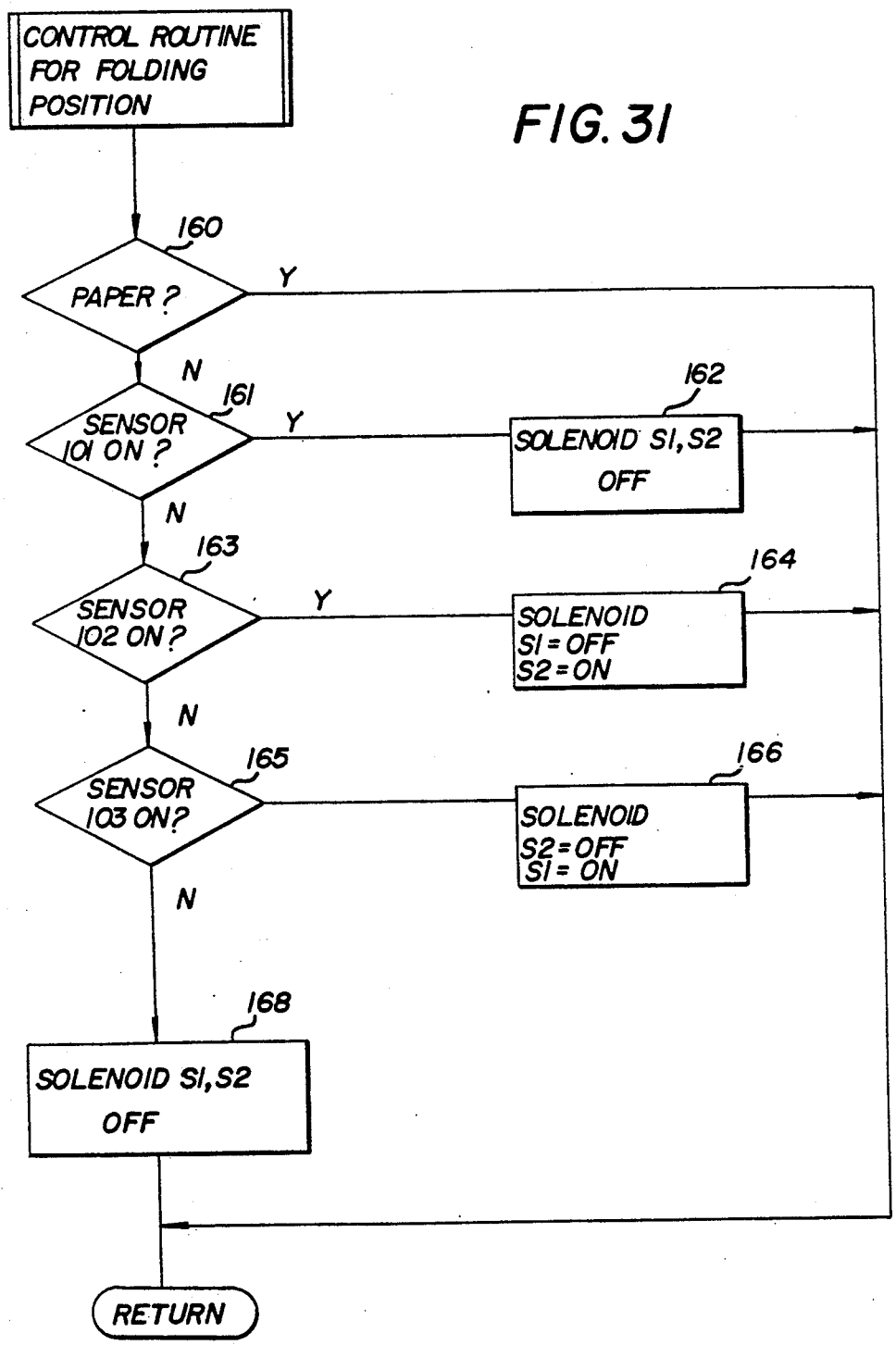
FIG. 31 is a control flowchart of a receiving paper length sensor and middle length stopper.

As shown in the control flowchart in FIG. 31, first, in the step 160, a recording paper input sensor 104 checks whether the end edge of the recording paper B is terminated. Then, when the recording paper input sensor 104 is in OFF state, which means that the end edge of the recording paper B is absent, succeedingly, in steps 161, 163 and 165, recording paper length sensors 101, 102 and 103 detect the position of the leading end of the recording paper B.

Then, in step 161, when the recording paper length sensor 101 is in ON state, as the leading end of the recording paper B reaches the recording paper length sensor 101, the length of the recording paper is approximately of B4, the maximum length in the embodiment, and since the leading end of the recording paper B is required to reach the maximum paper length stopper 108 in this case, as shown in step 162, solenoids S1 and S2 are not turned on and the middle length stoppers 106 and 107 do not come out.

In step 163, when the recording paper length sensor 101 is in OFF state and the recording paper length sensor 102 is in ON state, as the length of the recording paper is approximately of A4 size in the embodiment, the middle length stopper 107 is required to come out to stop the paper at this point, and therefore, the solenoid S2 is turned on.

Succeedingly, in step 165, both of the recording paper length sensors 101 and 102 and in OFF state, while the recording paper length sensor 103 is in ON state, as the length is of B5 that is the minimum length in the embodiment, the middle length stopper 6 is required to come out, and thereby, the solenoid S1 is turned on.

In step 167, in the case that the recording paper input sensor 104 is in OFF state, while none of the recording paper length sensors 101, 102 and 103 is in ON state, as the length of the recording paper B is shorter than the specified length, the sealing device A is stopped to display the error indication, as it is an error (step 168).

Succeedingly, referring to FIGS. 23 to 26, the recording paper pressers 128 and 129, and the slip stopper 132 are described.

As in the invention, the recording paper sensors 101, 102 and 103 are employed to differ the folding place depending on the length of the recording paper B, in the case that a sheet of the recording paper B is folded, the upper folded part always comes to be longer than the lower folded part.

Figure 26:
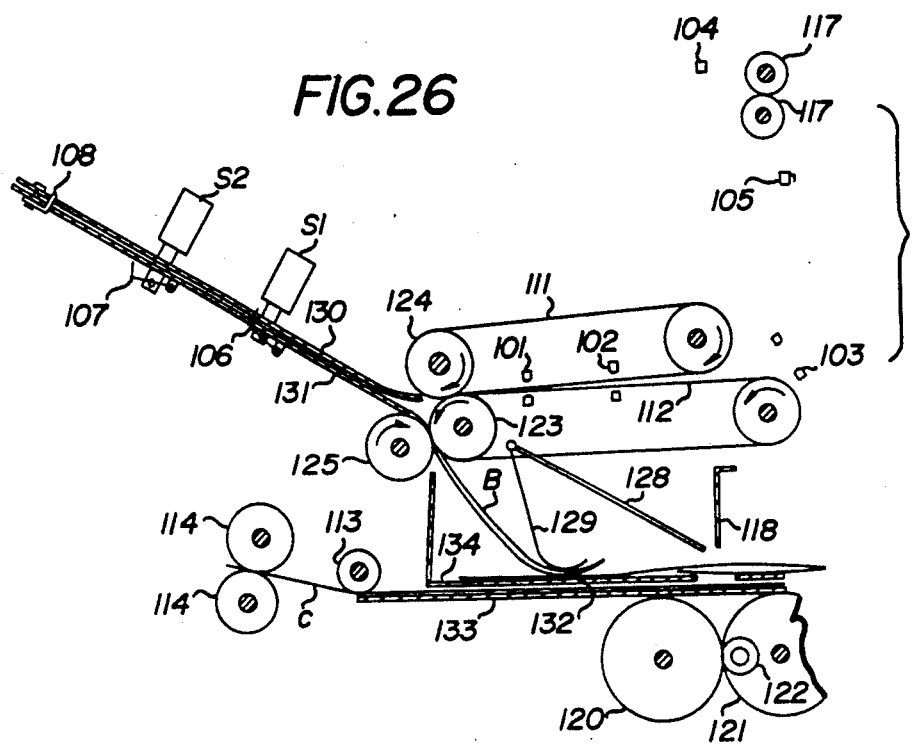
Figure 27:
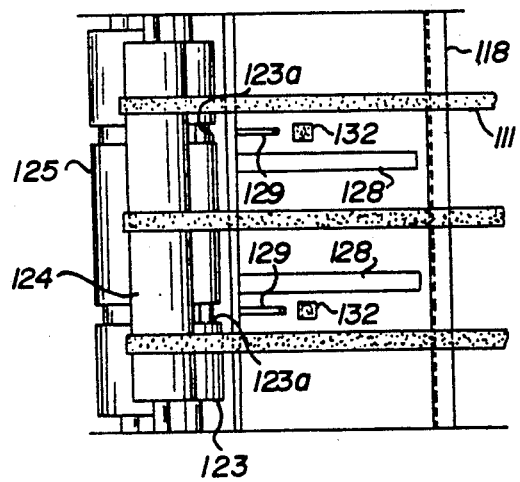
FIG. 27 is a plan view of the presser part for receiving paper.
Figure 28:
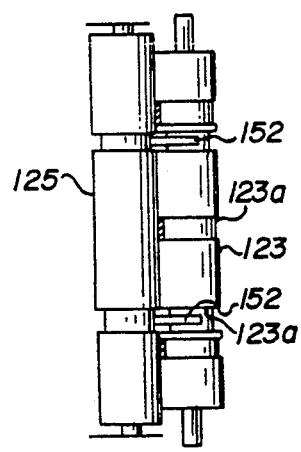
FIG. 28 is a bottom view of the presser part for receiving paper in FIG. 27.
Figure 29:
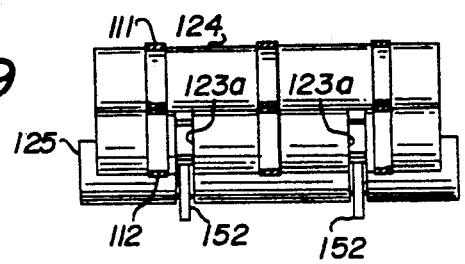
FIG. 29 is a front view of the presser part for receiving paper in FIG. 27.

By thus setting the upper part longer, as shown in FIG. 26, when the succeeding folded recording paper B is stacked while sliding, there is no part for the paper to stick on.

However, since the leading end of the folded recording paper B remains curly as it has been once rolled, as shown in FIG. 25, it sometimes goes upward before the plaiting blade 118 without passing beneath the plaiting blade 118, and in order to solve such inconvenience, the recording paper presser 128 is vertically suspended.

As shown in FIG. 26, when the succeeding folded recording paper B is slid onto the folded recording paper B stacked priorly on the recording paper tray 134, it sometimes pushes the previous recording paper B in a floating state simultaneously to move it forward, and the previous paper is moved to such position that the destination column of the recording paper B is dislocated from the superscription window of the envelope paper C, or out of the width of the envelope paper C placed beneath it.

In order to prevent the previous recording paper B from moving, the slip stopper 132 is employed on the upper surface of the recording paper tray 134, and thereby, the free sliding of the first folded recording paper B is prevented. The recording paper presser 129 constructed above the slip stopper 132 presses the first folded receiving paper B in the contacting direction with the slip stopper 132.

As shown in FIGS. 22 and 24, a feed-out spring 152 extends from the upper end part of the recording paper tray 134, and the feed-out spring 152 invades into a groove 123a constructed in the folding guide roller 123.

By thus constructing the feed-out spring 152, such inconvenience can be solved that although once the recording paper is fed out by the folding guide rollers 123 and 125, it remains near the folding guide rollers 123 and 125 and, when the folding guide rollers 123 and 125 are rolled by the first driving motor M1 counterclockwise, drawn in between the folding guide rollers 123 and 125 again in the folding work by the plaiting blade 118 to be damaged thereby.

FIG. 23 shows the terminal edge of the recording paper B remaining near the folding guide rollers 123 and 125, in the case that the feed-out spring 152 is not employed.

Figure 30:
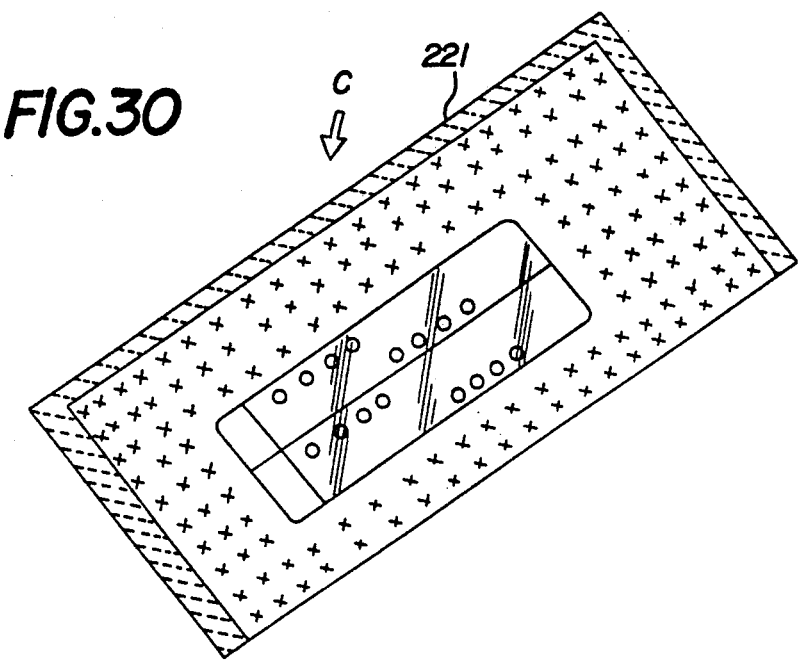
FIG. 30 is a perspective view of envelope paper in a sealed state.

FIG. 30 is a perspective view of the envelope paper C in the sealed state.

On the outer circumferential edge of the envelope paper C in Fi.. 30, a sizing margin 221 is employed, and it is compression-bonded by the sealing folding rollers 120 and 121 and the deckle edge compression-band roller 122.

As explained hereinbefore, as a medium length stopper is employed between the folding guide roller and the maximum paper length stopper, a recording paper length sensor to detect the length of the recording paper, and a driving means of the medium length stopper corresponding to the signal from the recording paper length sensor, even in the case that the length of each recording paper B received differs, since the paper is folded in the middle, the upper folded part that is fed after the recording paper B can always be longer, and the folded recording paper B inserted thereafter to the recording paper tray 134 do not stick to the folded recording paper priorly fed.

Since it is constructed in such a manner that the upper folded part is longer than the lower folded part, in the case of employing the recording paper length sensor and the medium length stopper and placing the recording paper B on the recording paper tray in the folded state, when the recording paper B is stacked in the folded state on the recording paper tray 134 and the succeeding recording paper B in the folded state is stacked sliding on it, it can smoothly slide and create a laminate, as the upper side is longer and there is no stickable part.

In the case that the excess length sensor 105 to detect the reporting paper having a length exceeding the specified length is constructed between the recording paper take-in mechanism and the first folding means, and that the recording paper with excessive length is detected by the excess length sensor 105, as the sealing device is composed to stop, such inconvenience does not occur that the recording paper B having a longer length than sealable is taken in the device, pinched between the recording paper feed-out exit roller 212 of the facsimile device F and the folding guide rollers 123 and 124 and torn, and the message comes to be illegible, or that an excessive load is created in the recording paper feed-out roller 212 in the facsimile device F or in the folding guide rollers 123 and 124, and thereby the facsimile device F or the sealing device A is damaged.

Since the recording paper presser is placed above the recording paper fed out onto the receiving tray from the exit side of the folding guide roller, such inconvenience does not occur that the superscription printed on the first folded recording paper B dislocates from the superscription window of the envelope paper C, and thereby the destination of the document comes to be unknown after it is sealed.

Moreover, such inconvenience has been solved that the leading end of the folded recording paper B goes upward along the plaiting blade 118 without passing under the plaiting blade 118, the succeeding folded recording paper B follows the previous paper and stops before the plaiting blade 118 and is not sealed.

In addition, such inconvenience has been solved that the first folded recording paper B is pushed out by the succeeding folded recording paper B and moves to a point exceeding the range of the envelope paper C.

As shown in FIG. 20 and FIGS. 36 to 38, in order to simultaneously fold and seal a laminate of the envelope paper C and the recording paper B by rolling the sealing folding roller 120 and 121, a one-way clutch 264 is adopted which idles the envelope paper feed-in roller 114 when the envelope paper C is pulled. Therefore, as the clutch 264 is adopted, when the sealing folding rollers 120 and 121 and the deckle edge compression-bond roller 122 (FIG. 20) roll and pull the envelope paper C in a laminate, the envelope paper feed-in roller 121 is idled by the one-way clutch 264 and stopped by the electromagnetic brake device 147 (FIG. 20), and as the envelope paper C is stretched quickly from a flexing state, the buster knife 113 which invades into the perforated line downward is placed between the envelope paper feed-in roller 114 and the sealing folding rollers 120 and 121, the envelope paper C is cut with an impact in the perforated line exactly under the buster knife 113.

Figure 36:
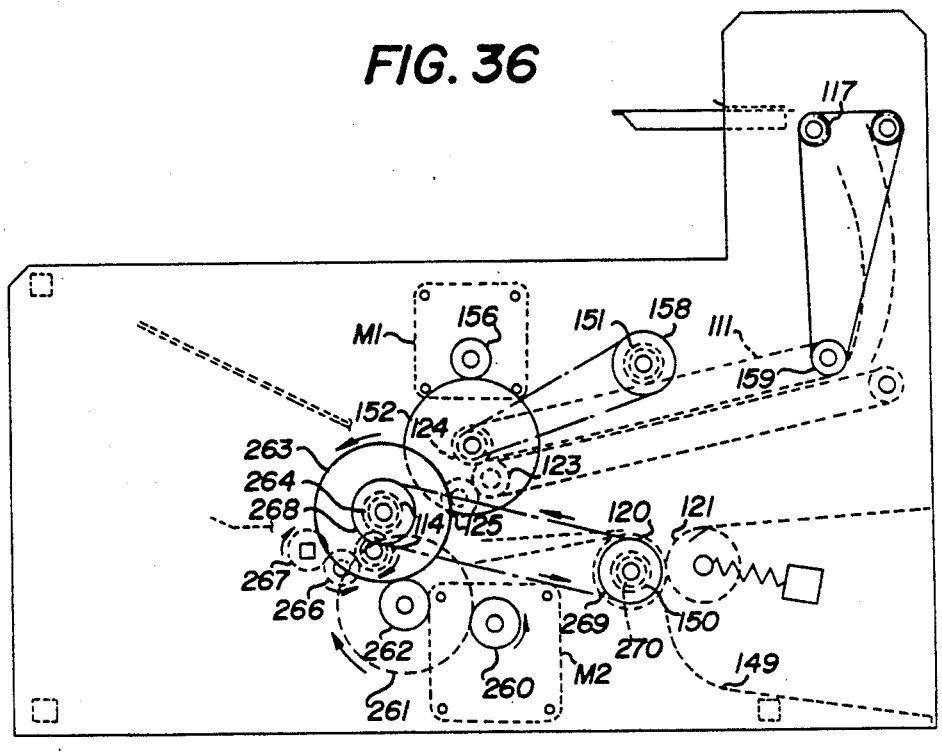
FIGS. 36 and 37 are side views showing the driving system in the embodiment in FIG. 20.
Figure 37:
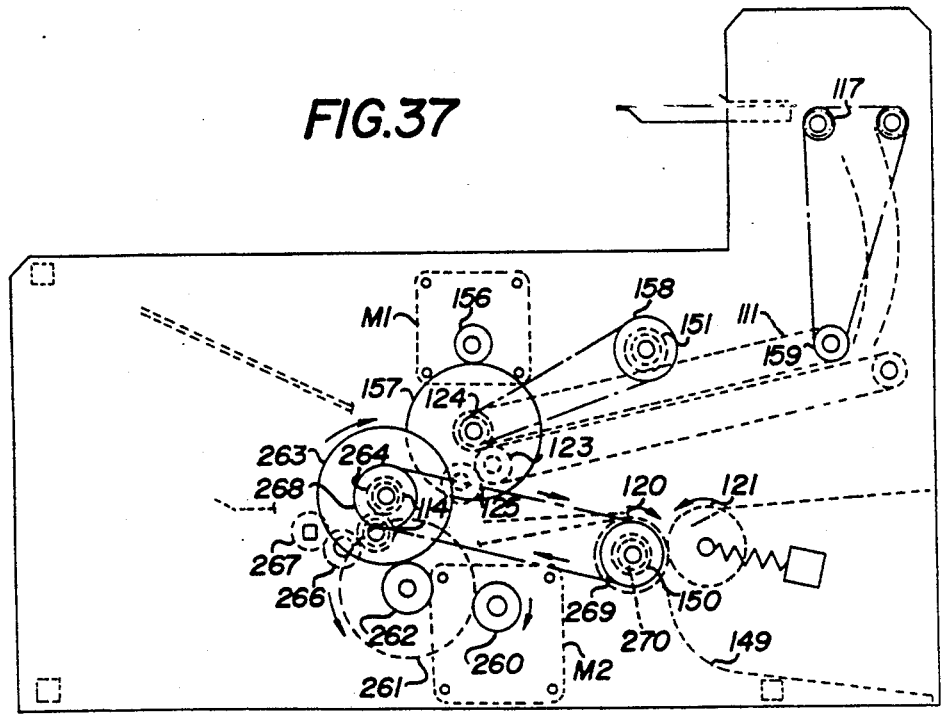
Figure 38:
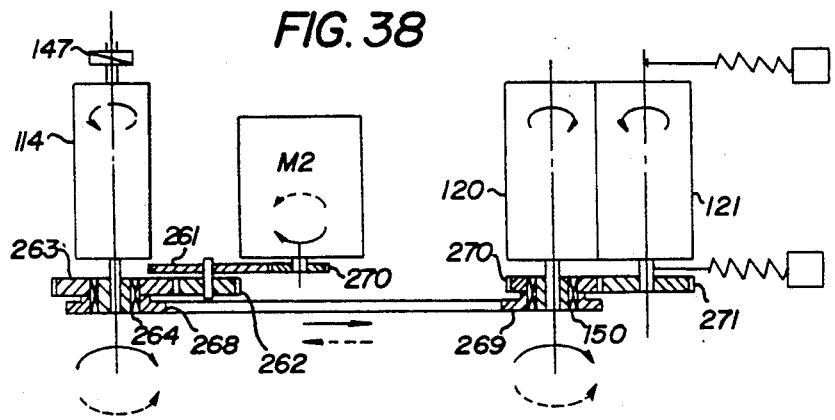
FIG. 38 is a side view of the driving system in FIGS. 36 and 37.

Referring now to FIGS. 36, 37 and 38, the driving system is described further in detail.

A gear 156 on the shaft of the first driving motor M1 engages with a gear 157 on the shaft of the folding guide roller 124 to drive the folding guide roller 124. The folding guide roller 123 is driven by the folding guide roller 124 through a gear not shown in the figure, and the folding roller 125 is, then, driven by the folding guide roller 123 through a gear not shown. A pulley 159 is driven by the upper transporting belt 111 winding about the folding guide roller 124, and the guide rollers 116 and 117 in the take-in part is driven by the pulley 159.

A pulley 158 on the driving shaft of the eccentric cam ring 146 is driven by a pulley not shown of the folding guide roller 124 through the belt.

A one-way clutch 151 is employed in a part of the pulley 158 to rotate the eccentric cam ring 146 through the one-way clutch 151 and to move the plaiting blade 118 upward and downward, only in the case that the first driving motor M1 rotates counterclockwise.

A gear 260 on the shaft of the second driving motor M2 engages with a gear 261, and a gear 262 with a smaller diameter on the shaft of the gear 261 engages with a gear 263 with a larger diameter on the driving shaft of the envelope paper feed-in roller 114. Between the gear 263 with a larger diameter and the shaft of the envelope paper feed-in roller 114, the aforementioned one-way clutch 264 is employed. A counter-gear 266 is rolled by a gear on the other shaft of the envelope paper feed-in roller 114, and the counter gear 266 drives a driving gear 267 of the tractor feeder 138 (FIG. 20).

A pulley 269 on the shaft of the sealing folding roller 120 is driven by a pulley 268 united with the gear 263 with a larger diameter, and between the pulley 269 and the sealing folding roller 120, a one-way clutch 150 is employed.

Figure 39:
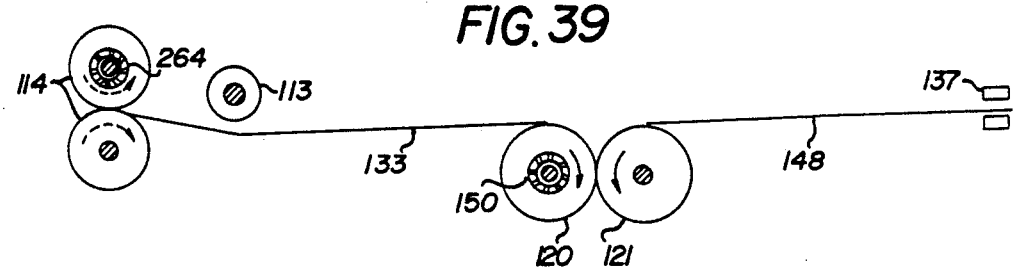
FIG. 39 is a sectional plan view of the driving system of a take-in roller for envelope paper and sealing and folding roller.

The pulley 269 and a gear 170 are fixed in one unit, and the gear 270 engages with a gear 271 on the shaft of the sealing folding roller 121 (FIG. 39).

As described above, a one-way clutch 264 is employed on the envelope paper feed-in roller 114, the one-way clutch 150 is employed on the shaft of the sealing folding roller 120, and as the envelope paper feed-in roller 114 and the sealing folding rollers 120 and 121 are set to rotate reversely, when one of them rotates, the other is constructed to stop.

Therefore, as shown in FIG. 36, while the envelope paper feed-in roller 114 rotates to transport the envelope paper C, as the sealing folding rollers 120 and 121 do not rotate reversely, such inconvenience that the sealed envelope on the discharge guide plate 149 is drawn in again does not occur. Reversely, as in FIG. 37, when the sealing folding rollers 120 and 121 rotate to enclose and seal, by rotating the sealing folding rollers 120 and 121 and stopping the envelope paper feed-in roller 114 by the electromagnetic brake device 147, the envelope paper C comes to have a tension, and the buster knife 113 invades into the perforated line in the tensile part to cut it.

The aforementioned construction is disclosed in FIGS. 39 to 44.

In other words, an envelope paper guide plate 133 is placed in the part where the envelope paper C is fed in by the envelope paper feed-in roller 114, and succeedingly, an envelope paper guide plate 148 is placed with a spacing of inlet of the sealing folding rollers 120 and 121. Then, an envelope paper waiting sensor 137 which detects that the envelope paper C has reached to the envelope paper guide plate 148 is placed.

The buster knife 113 is placed in the upper part between the envelope paper feed-in roller 114 and the sealing folding rollers 120 and 121, and the envelope paper guide plate 133 is bent downward in a convex shape at the part facing to the buster knife 113.

Figure 40:
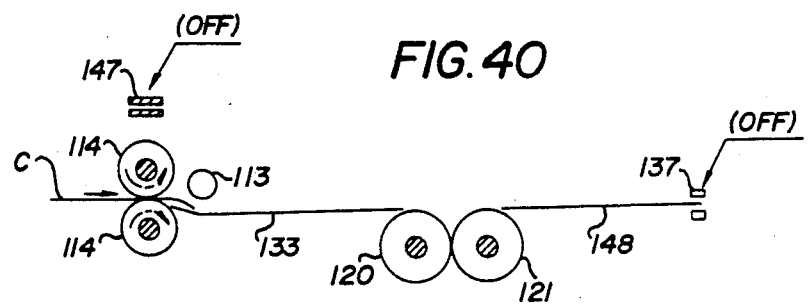
FIGS. 40 to 44 are side views showing the operation of the driving system in FIG. 39.
Figure 41:
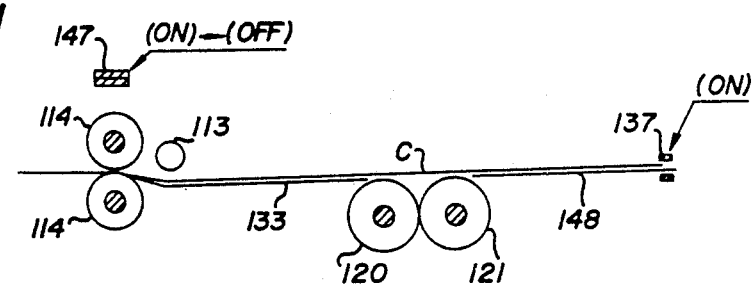

As shown in FIGS. 40 and 41, the envelope paper C is supplied in such state. Succeedingly, the second driving motor M2 (FIG. 38) rotates reversely, the envelope paper feed-in roller 114 is idled by the one-way clutch 264 (FIG. 38) and simultaneously, stopped (FIGS. 42 and 43) by the electromagnetic brake device 147 (FIG. 38). In addition, the sealing folding rollers 120 and 121 which have been idled by the one-way clutch 150 (FIG. 38) starts rotating together with the reverse rotation of the second driving motor M2, the envelope paper C gradually comes to have a tension as the plaiting blade 118 lowers, and as the perforated line locates exactly under the buster knife 113, the buster knife 113 invades into the perforated line to cut it (FIG. 44).

Figure 42:
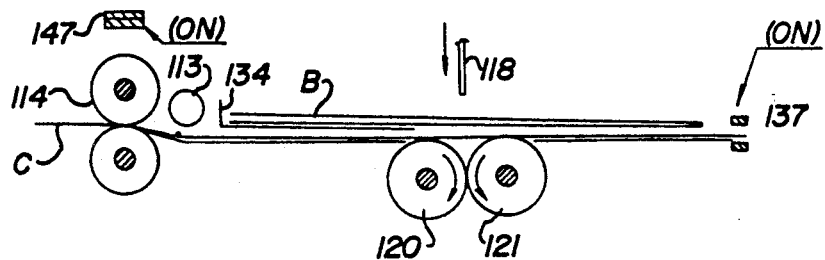
Figure 43:
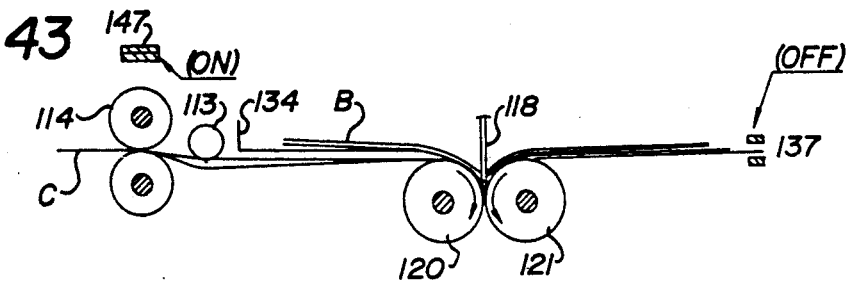
Figure 44:
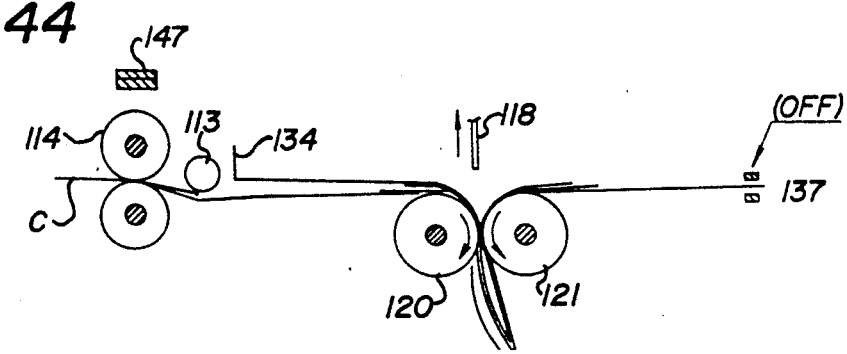

On the other hand, the folded recording paper B is stacked on the envelope paper C, as shown in FIGS. 42 to 44, and from above them, the plaiting blade 118 lowers The plaiting blade 118 lowers nearly to the middle of the sealing folding rollers 120 and 121, and it returns upward after putting the folded envelope paper C and the recording paper B between the sealing folding rollers 120 and 121.

As an adhesive is applied on the edges of the envelope paper C, it is pasted enclosing the recording paper B inside by being pressed by the deckle edge compression-bond roller 22.

Figure 46:
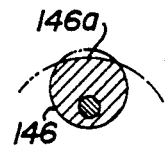
FIG. 46 is a sectional view showing the shape of an eccentric cam ring.
Figure 45:
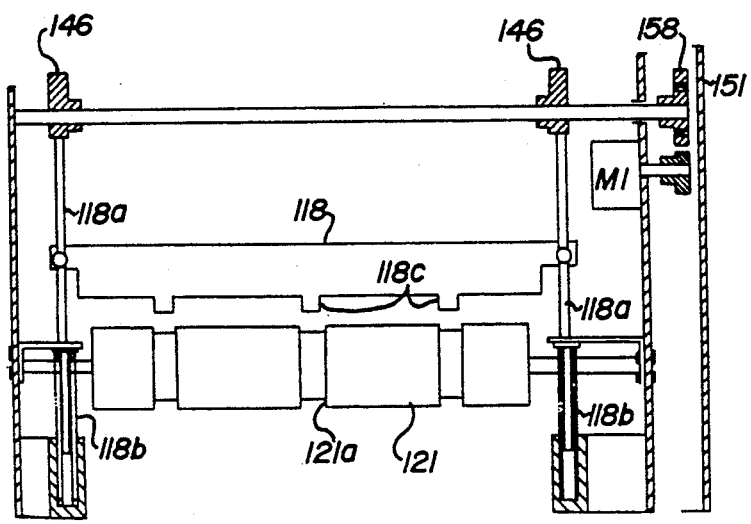
FIG. 45 is a front sectional view showing a sealing and folding roller with a concave.

Succeedingly, FIGS. 45 and 46 are explained.

As mentioned before, the one-way clutch 151 is employed in the pulley 158 driven by the first driving motor M1, and it drives the shaft of the eccentric cam ring 146.

As shown in FIG. 46, the eccentric cam ring 146 has a notch 146 in a part of a circular cam, and by the notch 146, the folding blade 118 stops momentarily at the lowest end.

The eccentric cam ring 146 pushes down the blade supporting rail 118a which supports the plaiting blade 118 opposing to an upper stressing spring (helical spring) 118b. Thus, the plaiting blade 118 is pushed between the sealing folding rollers 120 and 121.

The eccentric cam ring 146, blade supporting rail 118a and the helical spring 118b are constructed in right and left, respectively (FIG. 45).

In the plaiting blade 118, a convex 118c (FIG. 45) is formed, and the convex 118c is constructed to invade into a ring concave groove 121a formed in the outer circumference of the sealing folding roller 121.

In order to stop the plaiting blade 118 at the highest withdrawn position, a cam position detective switch 144 and a switch presser pin 146b are employed as well as a switch 145 which detects when the plaiting blade 118 is at the lowest position (FIG. 33).

Figure 47:
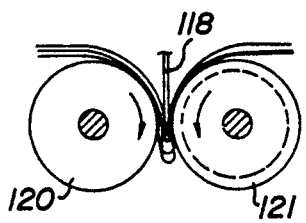
FIGS. 47 and 48 are drawings showing the press-inserting states by a plaiting blade of the invention.
Figure 48:
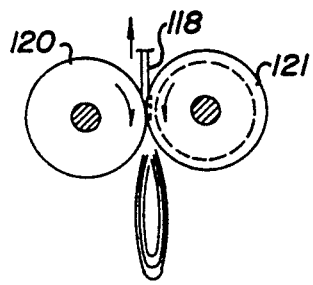

In the invention, by forming the ring concave groove 121a in the sealing folding roller 121 and a convex 118c invading into the ring concave groove 121a in the plaiting blade 118, as shown in FIGS. 47 and 48, the plaiting blade 118 can be inserted to the central position of the sealing folding rollers 120 and 121, the plaiting blade 118 is never obstructed by the rollers, even in the case that the recording paper B and the envelope paper C starts moving held by the sealing folding rollers 120 and 121, and therefore, the plaiting blade 118 securely goes back.

Figure 49:
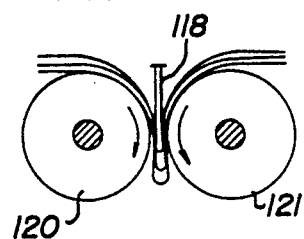
FIGS. 49 to 52 are drawings showing the press-inserting states by a conventional plaiting blade.
Figure 50:
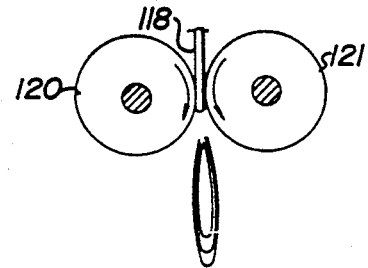

Conventionally, as shown in FIGS. 49 and 50, if the plaiting blade 118 is pushed in until it is completely pinched between the sealing folding rollers 120 and 121, the plaiting blade 118 itself is pinched as well, and even if the eccentric cam ring 146 goes back, the plaiting blade 118 can not return, which has been an inconvenience.

Figure 51:
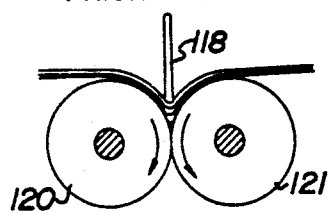
Figure 52:
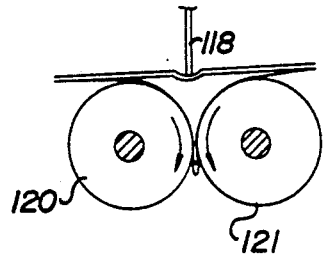

Moreover, as shown in FIGS. 51 and 52, if the invading rating of the plaiting blade 118 is lowered, in the case that the number of sheets of the recording paper B is large, the recording paper B near the top sheet may return without being drawn in sufficiently, which causes an error in sealing.

As described hereinabove, by this invention, by stacking the recording paper and the envelope paper in a laminate and mutually pressing them to push between a pair of sealing folding rollers by the plaiting blade, as the push-in speed of the plaiting blade and the rotating peripheral speed of the sealing folding rollers are approximately equal in the system of enclosing and sealing the recording paper and the envelope paper, in the case that the laminate of the recording paper B and the envelope paper C is pushed in by the plaiting blade 118, such inconvenience that the upper part of the recording paper remains unfed due to an exceedingly high speed in the rotation of the sealing folding rollers 120 and 121, and such inconvenience that a damage or tear of the recording paper B may occur by the pushing force of the plaiting blade 118 caused by an exceedingly high speed of the plaiting blade 118 can be solved.

As the plaiting blade is constructed to stop momentarily at the lowest position, it has become possible to keep the time until the laminate of the recording paper B and the envelope paper C is sufficiently put between the sealing folding rollers 120 and 121, and such inconvenience has been solved that the upper part of the stacked recording paper B remains unfed.

As a ring concave groove is formed on one of the sealing folding rollers, and a convex invading into the ring concave groove is formed in the folding blade, even when the plaiting blade 118 is lowered further than the central position of the sealing folding rollers 120 and 121, the plaiting blade 118 is not pinched between the rollers, and the laminate of documents can be put between the sealing folding rollers 120 and 121 without any mistake.

As the recording paper and the envelope paper are stacked in a laminate, and by pushing it between a pair of sealing folding rollers rotating mutually pressed by the plaiting blade, in the system of enclosing and sealing the recording paper and the envelope paper, as a cutter for envelope paper is placed in such a manner that the blade is positioned between the surface of a part of the envelope paper extending between the envelope paper exit side and the sealing folding roller in a tensile state and in a flexing state and that the surface of the paper impacts the blade when the envelope paper is in a tensile state, and the sealing folding rollers, and a pressing means is employed retractably in the sealing folding roller on the reverse side of the cutter with a changeable spacing to the sealing folding roller, the tensile force of the envelope paper C generated by the sealing folding roller 120 on the side of the buster knife 113 is not lowered regardless of the number of the receiving paper, the envelope paper C is cut at the perforated line by the buster knife 113 without any mistake.

As the electromagnetic brake device is employed in the envelope paper feed-in roller transporting the envelope onto the sealing folding roller, the electromagnetic brake device is actuated simultaneously with the pushing of the plaiting blade, and the buster knife which cuts into the envelope paper in a tensile state is placed between the envelope paper feed-in roller and the sealing folding roller, when the envelope paper C is folded by the plaiting blade 118, even in the case that the envelope paper C might move slightly, as it is fixed at the end by the electromagnetic brake device 147, it does not move correspondently, and the perforated line of the envelope paper feed-in roller 114 never dislocates off the buster knife 113.

By reversely rotating the driving motor driving the envelope paper feed-in roller, as the one-way clutch is placed on the driving shaft of the sealing folding roller to drive the sealing folding roller, the two different driving parts are driven by utilizing clockwise and counterclockwise rotations, which results in smaller number of motors, while conventionally plural motors have been used in order to drive the sealing folding rollers 120 and 121, and the envelope paper feed-in roller 114.

What is claimed is:

1. A sealing device for sealing facsimile receiving paper received from a facsimile receiver, comprising:

first receiving means for taking in a sheet of facsimile receiving paper discharged from a facsimile receiver;

first folding means receiving said sheet of facsimile receiving paper from said first receiving means, for folding the received sheet of facsimile receiving paper in half to form a folded sheet;

second receiving means for receiving said folded sheet;

envelope paper supply means for supplying envelope paper to said second receiving means;

second folding means for folding together a laminate of said folded sheet and said envelope paper supplied by said envelope paper supply means to form a folded laminate in which said envelope paper is folded about said folded sheet; and sealing means for sealing said folded sheet within said envelope paper by adhering together adjacent edges of said envelope paper.

2. A sealing device for facsimile receiving paper according to claim 1, wherein the facsimile receiving paper is supplies from a wound roll from the facsimile receiver, the receiving paper tending to curl in a preferred curling direction resulting from having been wound on the roll, and further comprising:

an enclosure having an outer frame enclosing at least said first receiving means, said outer frame having an upper surface, said upper surface including a shelf portion for supporting the facsimile receiver and a raised portion extending upwardly from said shelf portion, said raised portion comprising an inlet means facing an outlet for the facsimile receiving paper of the facsimile receiver for receiving the facsimile receiving paper discharged from the outlet of the facsimile receiver, a feed-out means inside said enclosure and facing said inlet means, for transporting the facsimile receiving paper received through said inlet means, and a transporting means receiving the facsimile receiving paper from said feed-out means for further transporting of the facsimile receiving paper along a predetermined path, and said transporting means includes a member which is curved in the same direction as the preferred curling direction of the facsimile receiving paper.

3. A sealing device for facsimile receiving paper according to claim 1, wherein the second folding means is composed of a pair of sealing folding rollers rolling mutually pressure-connected and a plaiting blade pushing the receiving paper and the envelope paper place in a laminate in between the rollers, and a ring concave groove is formed in the sealing folding roller, and a convex invading into the ring concave groove is formed in the plaiting blade.

4. A sealing device for facsimile receiving paper according to claim 1, wherein the second folding means is composed of a pair of sealing folding rollers rolling mutually pressure-connected and a plaiting blade pushing the receiving paper and the envelope paper placed in a laminate in between the rollers, a cutter knife for the envelope paper is placed between the surface of a part of the envelope paper extending between the envelope paper exit side and the sealing folding roller in a tensile state and in a flexing state, and that the surface of the paper impacts the blade when the envelope paper is in a tensile state, and a pressing means with a changeable spacing between the sealing folding rollers is retractably employed in the sealing folding roller of the reverse side of the cutter knife.

5. A sealing device for facsimile receiving paper according to claim 1, wherein the second folding means is composed of a pair of sealing folding rollers rolling mutually pressure-connected and a plaiting blade pushing the receiving paper and the envelope paper placed in a laminate in between the rollers, an electromagnetic brake device is employed in the envelope paper feed-in roller transporting the envelope paper onto the sealing folding roller, the electromagnetic brake device is operated simultaneously with the pushing of the plaiting blade, and a cutter knife which cuts the envelope paper in a tensile state is placed between the envelope paper feed-in roller and the sealing folding roller.

6. A sealing device for facsimile receiving paper according to claim 5, wherein a one-way clutch is employed on the driving shaft of the sealing folding roller to drive the sealing folding roller by reversely rotating the driving motor driving the envelope paper feed-in roller.

7. A sealing device for sealing facsimile receiving paper received from a facsimile receiver, comprising:

first receiving means for taking in a sheet of facsimile receiving paper discharged from facsimile receiver;

first folding means receiving said sheet of facsimile receiving paper from said first receiving means, for folding the received sheet of facsimile receiving paper in half to form a folded sheet;

second receiving means for receiving said folded sheet;

envelope paper supply means for supplying envelope paper to said second receiving means;

second folding means for folding together a laminate of said folded sheet and said envelope paper supplied by said envelope paper supply means to form a folded laminate in which said envelope paper is folded about said folded sheet;

sealing means for sealing said folded sheet within said folded sheet and said envelope paper supplied by said envelope paper supply means to form a folded laminate in which said envelope paper is folded about said folded sheet;

sealing means for sealing said folded sheet within said envelope paper by adhering together adjacent edges of said envelope paper; and wherein said first folding means comprises: a folding guide roller and a maximum paper length stopper, at least one middle length stopper arranged between said folding guide roller and said maximum paper length stopper, a receiving paper length sensor means located along said predetermined path for detecting a length of said facsimile receiving paper is formed in said predetermined path for said facsimile receiving paper, and means for driving said middle length stopper according to the signal from said receiving paper length sensor.

8. A sealing device for facsimile receiving paper according to claim 7, wherein a receiving paper tray is placed in the direction of sending out the receiving paper of the folding guide roller of the first folding means, and in the case that the receiving paper is placed in a folded state on the receiving paper tray, the upper folded side is longer than the lower folded side.

9. A sealing device for sealing facsimile receiving paper received from a facsimile receiver, comprising:

first receiving means for taking in a sheet of facsimile receiving paper discharged form a facsimile receiver;

first folding means receiving said sheet of facsimile receiving paper from said first receiving means, for folding the received sheet of facsimile receiving paper in half to form a folded sheet;

second receiving means for receiving said folded sheet;

envelope paper supply means for supplying envelope paper to said second receiving means;

second folding means for folding together a laminate of said folded sheet and said envelope paper supplied by said envelope paper supply means to form a folded laminate in which said envelope paper is folded about said folded sheet; and sealing means for sealing said folded sheet within said envelope paper by adhering together adjacent edges of said envelope paper;

wherein said second folding means is composed of a pair of rollers folding said envelope paper into two halves such that said facsimile receiving paper on said envelope paper is disposed between said two halves of said envelope paper, and said sealing means includes pressure-applying means urging said pair of rollers together for applying pressure to opposite sides of said envelope paper to seal edges of said two halves together by compression-bonding along a folding direction of said envelope paper, and said pressure-applying means including a pressure-connecting roller closely contacting both sides of one of said pair rollers.

10. A sealing device for sealing facsimile receiving paper received from a facsimile receiver, comprising:

first receiving means for taking in a sheet of facsimile receiving paper discharged from a facsimile receiver;

first folding means receiving said sheet of facsimile receiving paper from said first receiving means, for folding the received sheet of facsimile receiving paper in half to form a folded sheet;

second receiving means for receiving said folded sheet;

envelope paper supply means for supplying envelope paper to said second receiving means;

second folding means for folding together a laminate of said folded sheet and said envelope paper supplied by said envelope paper supply means to form a folded laminate in which said envelope paper is folded about said folded sheet; and sealing means for sealing said folded sheet within said envelope paper by adhering together adjacent edges of said envelope paper;

wherein said second folding means is composed of a pair of sealing folding rollers rolling under pressure against each other, and a plaiting blade for pushing an intermediate portion of said facsimile receiving paper and of said envelope paper together between said pair of sealing folding rollers, said plaiting blade pushing said intermediate portion of said facsimile receiving paper at a predetermined speed which is the same as the rotating peripheral speed of said pair of sealing folding rollers.

11. A sealing device for facsimile receiving paper according to claim 10, wherein the plaiting blade is composed in such a manner that it temporarily stops at the lowest position.

* * * * *